(12) United States Patent
Ohtake

(10) Patent No.: US 7,245,442 B2
(45) Date of Patent: Jul. 17, 2007

(54) ZOOM LENS AND IMAGE PICKUP

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/455,147

(22) Filed: Jun. 19, 2006

(65) Prior Publication Data

US 2006/0291071 A1 Dec. 28, 2006

(30) Foreign Application Priority Data

Jun. 23, 2005 (JP) ............... 2005-183207

(51) Int. Cl.
*G02B 15/14* (2006.01)
(52) U.S. Cl. ...................... 359/687; 359/686
(58) Field of Classification Search ............. 359/683, 359/686, 687
See application file for complete search history.

(56) References Cited

U.S. PATENT DOCUMENTS 6,606,194 B2 * 8/2003 Hamano et al. ............ 359/557
2002/0063961 A1 5/2002 Hamano et al.

FOREIGN PATENT DOCUMENTS

| JP | 06-337353 A1 | 12/1994 |
| JP | 11-237550 | 8/1999 |
| JP | 2002-162563 A1 | 6/2002 |
| JP | 2002-244037 A | 8/2002 |
| JP | 2003-228001 A | 8/2003 |
| JP | 2003-295057 A | 10/2003 |

* cited by examiner

*Primary Examiner*—Ricky Mack
*Assistant Examiner*—William Choi
(74) *Attorney, Agent, or Firm*—Rader Fishman & Grauer PLLC; Ronald P. Kananen

(57) ABSTRACT

A zoom lens is disclosed which is superior in reduction of the lens diameter and can suppress degradation in performance while a high zoom ratio is achieved. The zoom lens is formed as a zoom lens of a four-group configuration having positive, negative, positive and positive groups. The second and fourth lens groups move whereas the first and third lens groups are fixed. An aperture stop is disposed on the object side of the third lens group. The third lens group includes negative and positive sub groups with an air distance left therebetween. The positive sub group is shiftable perpendicularly to the optical axis to shift an image substantially perpendicularly. A conditional expression $1.4<|f3n|/f3<3$ is satisfied where $f3n$ is the focal distance of the negative sub group and $f3$ is the focal distance of the third lens group.

8 Claims, 26 Drawing Sheets

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

FIG.22
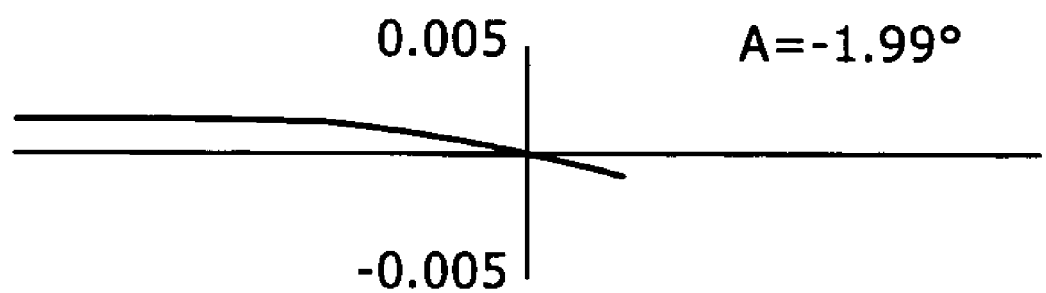
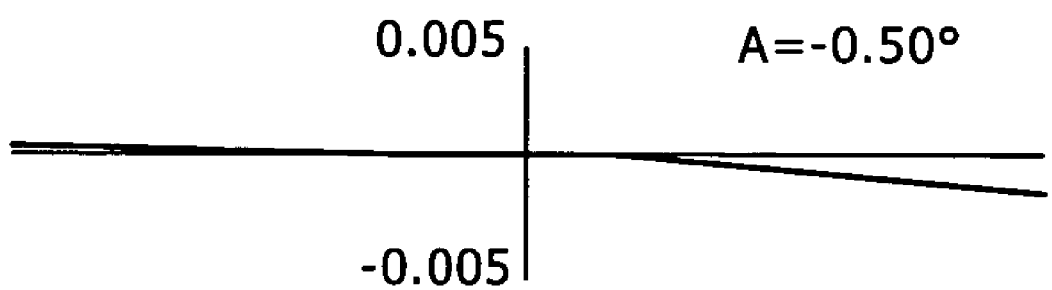
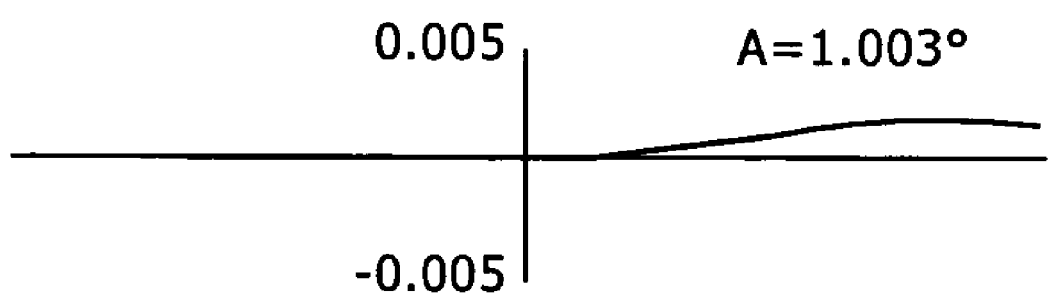
LATERAL ABERRATION

LATERAL ABERRATION

LATERAL ABERRATION

LATERAL ABERRATION

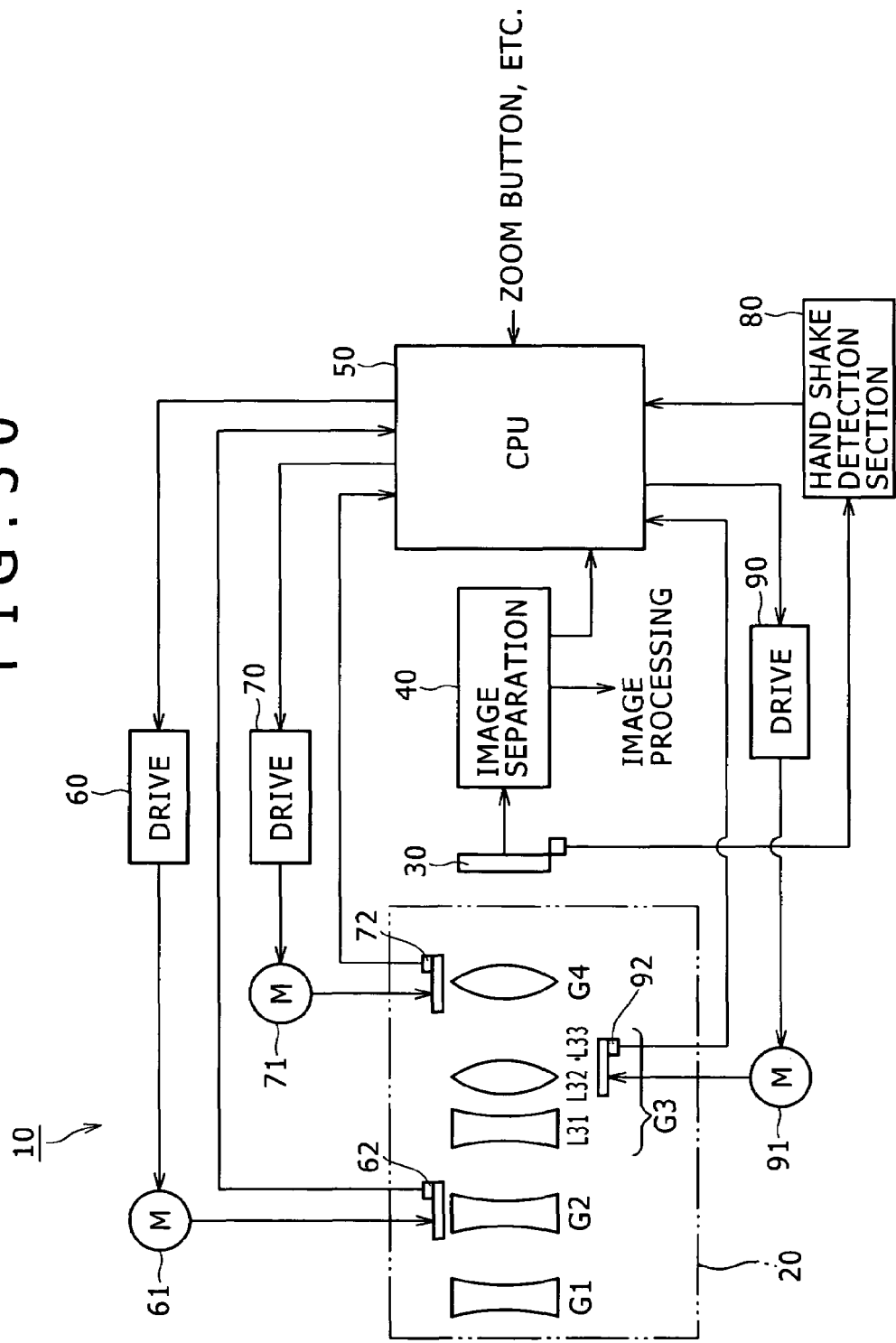

ZOOM LENS AND IMAGE PICKUP

CROSS REFERENCES TO RELATED APPLICATIONS

The present invention contains subject matter related to Japanese Patent Application P2005-183207 filed with the Japanese Patent Office on Jun. 23, 2005, the entire contents of which being incorporated herein by reference.

BACKGROUND OF THE INVENTION

This invention relates to a novel zoom lens and image pickup apparatus, and more particularly to a zoom lens and an image pickup apparatus which have a hand shake correction function and suppress deterioration of a performance which occurs upon image shifting while the variation power is high.

Conventionally, as a recording method of a camera, a method is known wherein a subject image formed on a surface of an image pickup device formed using a photoelectric conversion element such as a CCD (Charge Coupled Device) or a CMOS (Complementary Metal-Oxide Semiconductor) element is recorded by converting light amounts of the subject image into electric outputs by means of the photoelectric conversion elements.

Together with the technical progress of the fine working techniques in recent years, higher speed operation of a central processing unit (CPU) and higher integration of storage media are achieved, and such a large amount of image data as have not been able to be handled can now be processed at a high speed. Also for light receiving elements, higher integration and miniaturization is achieved, and the high integration makes it possible to achieve recording of higher spatial frequencies and the miniaturization makes it possible to achieve miniaturization of the entire camera.

However, such high integration and miniaturization as described above reduces the light receiving area of each photoelectric conversion element and hence decreases the electric output of the same, which gives rise to a problem of increase of the influence of noise. In order to prevent this, such a countermeasure has been taken as to increase the amount of light which arrives at the light receiving elements by increasing the aperture ratio of the optical system or disposing very small lens elements (that is, a microlens array) immediately in front of the light receiving elements. The microlens array introduces a flux of light, which is to come to a boundary between each adjacent elements, to the elements. Instead, the microlens array provides a restriction to the position of the exit pupil of the lens system. In particular, if the position of the exit pupil of the lens system moves toward a light receiving element, then the angle defined by a main light ray, which comes to the light receiving element, and the optical axis becomes great and an off-axis light flux directed toward peripheral portions of the light receiving element is provided with a great angle with respect to the optical axis. As a result, the off-axis light flux does not come to the light receiving element, resulting in shortage of the light amount.

A known zoom lenses suitable for a video camera or a digital still camera for recording a subject image is a zoom lens of a four-group configuration having positive, negative, positive and positive groups.

The zoom lens of a four-group configuration having positive, negative, positive and positive groups includes a first lens group having a positive refracting power, a second lens set having a negative refracting power, a third lens group having a positive refracting power and a fourth lens group having a positive refracting power, disposed in order from the object side. When the lens position state changes from the wide angle end state to the telephoto end state, the first and third lens groups are fixed in the direction of the optical axis while the second lens group moves toward the image side to perform a power variation operation and the fourth lens group acts to compensate for the variation of the image plane position which is caused by the movement of the second lens group.

An exemplary one of such four-group zoom lenses including four groups having positive, negative, positive and positive refracting powers is disclosed in Japanese Patent Laid-open No. Hei 6-337353 (hereinafter referred to as Patent Document 1).

Incidentally, an optical system having a high zoom ratio exhibits a reduced angle of view in a telephoto end state thereof, and therefore has a problem that a large blur occurs with an image even by a small hand shake.

An optical hand shake correction system is known as one of hand shake correction systems for correcting a blur of an image by a hand shake or the like.

The optical hand shake correction system uses a lens shift method wherein part of the lens system is shifted in a direction perpendicular to the optical axis, a variable apical angle prism method wherein the apical angle of a prism disposed immediately before the lens system is varied, or some other method. However, since the variable apical angle prism is disposed on the object side with respect to the first lens group which is largest in the lens system, the variable apical angle prism method has a subject to be solved where it is tried to achieve miniaturization including also a driving system.

The optical system of the lens shift type can function as an optical hand shake correction system which includes a combination of a detection system for detecting a shake of a camera caused by such a hand shake as may arise from a shutter release, a control system for providing a correction amount to the lens position based on a signal outputted from the detection system and a shift driving system for driving the shift lens based on an output of the control system and wherein a blur of an image caused by a shake of the camera is corrected by shifting of the lens by the driving system.

Such an optical system of the lens shift type as described above is disclosed, for example, in Japanese Patent Laid-open No. 2002-244037 (hereinafter referred to as Patent Document 2), Japanese Patent Laid-open No. 2003-228001 (hereinafter referred to as Patent Document 3), Japanese Patent Laid-open No. 2002-162563 (hereinafter referred to as Patent Document 4) or Japanese Patent Laid-open No. 2003-295057 (hereinafter referred to as Patent Document 5).

In the optical systems of the documents mentioned above, the entire third lens group disposed in the proximity of an aperture stop or some lens of the third lens group can be shifted in a direction substantially perpendicular to the optical axis to shift the image.

Since the third lens group is fixed in the direction of the optical axis, the shift driving system which is greater in a diametrical direction than the lens diameter can be fixed in the direction of the optical axis. Therefore, the optical system of the lens shift type is suitable for miniaturization of the entire system.

In the zoom lens disclosed in Patent Document 5, the entire third lens group is shifted to shift the image.

In the zoom lenses disclosed in Patent Document 3 and Patent Document 4, the third lens group is formed from a positive sub group and a negative sub group, and the positive sub group is shifted to shift the image.

In the zoom lens disclosed in Patent Document 2, the third lens group is formed from a negative sub group and a positive sub group, and the positive sub group is shifted to shift the image.

SUMMARY OF THE INVENTION

However, the conventional zoom lenses described above have the following problems where it is intended to achieve a high power variation ratio and a high performance.

Where the entire third lens group is shifted, it is necessary to correct the variation of off-axis aberration which arises when the lens position state of the third lens group varies and simultaneously correct the variation of various aberrations which arises upon hand shake correction. Therefore, negative distortional aberration which appears in a wide angle end state cannot be corrected appropriately. In order to solve this problem, it is necessary to decrease the refracting power of the second lens group. However, this increases the lens diameter of the first lens group, resulting in failure in sufficient miniaturization of the zoom lens.

Where the positive sub group disposed on the object side of the third lens group is shifted, the distances forwardly and backwardly of the aperture stop cannot be assured sufficiently, and this gives rise to interference with an iris mechanism section.

Where the positive sub group disposed on the image side of the third lens group is shifted, if it is tried to raise the power variation ratio, then the shift amount of the positive sub group becomes very large, which gives rise to a problem of increase in scale of the driving mechanism and complication of the structure.

It is an object of the present invention to provide a zoom lens and an image pickup apparatus which are superior in reduction of the lens diameter and can suppress degradation in performance while a high zoom ratio is achieved.

In order to attain the object described above, according to an embodiment of the present invention, there is provided a zoom lens which consists of four lens groups including a first lens group having a positive refracting power, a second lens group having a negative refracting power, a third lens group having a positive refracting power and a fourth lens group having a positive refracting power, the first, second, third and fourth lens groups being disposed in order from an object side, the second lens group moving, when a lens position state varies from a wide angle end state to a telephoto end state, to an image side while the fourth lens group moves so as to compensate for a variation of an image plane position caused by the movement of the second lens group whereas the first and third lens groups are fixed in the direction of an optical axis, and an aperture stop disposed on the object side of the third lens group, the third lens group including a negative sub group having a negative refracting power and a positive sub group having a positive refracting power and disposed on the image side of the negative sub group with an air distance left therebetween, the positive sub group being shiftable in a direction substantially perpendicular to the optical axis to shift an image in a direction substantially perpendicular to the optical axis, a conditional expression (1) $1.4<|f3n|/f3<3$ being satisfied where $f3n$ is the focal distance of the negative sub group disposed in the third lens group and $f3$ is the focal distance of the third lens group.

With the zoom lens, the image is shifted and degradation in performance upon image shifting is suppressed by shifting the positive sub group of the third lens group. Further, miniaturization of the zoom lens can be anticipated.

Preferably, the zoom lens is configured such that a conditional expression (2) $-0.3<(Rn+Rp)/(Rn-Rp)<0.3$ is satisfied where Rn is the radius of curvature of that lens face of the negative sub group disposed in the third lens group which is positioned nearest to the image side and Rp is the radius of curvature of that lens face of the positive sub group disposed in the third lens group which is positioned nearest to the object side. With the zoom lens, a variation of coma which appears when the positive sub group is shifted can be further +++ corrected favorably.

Preferably, the zoom lens is configured such that the negative sub group includes two lenses including a positive lens and a negative lens while the positive sub group includes three lenses including a positive lens, a negative lens and another positive lens, and a conditional expression (3) $0<(Rp1+Rp2)/(Rp1-Rp2)<2$ is satisfied where Rp1 is the radius of curvature of an object side lens face of that one of the positive lens groups of the positive sub group which is positioned nearest to the image side and Rp2 is the radius of curvature of an image side lens face of that one of the positive lenses of the positive sub group which is positioned nearest to the image side. With the zoom lens, a variation of coma which appears upon variation of the angle of view can be corrected favorably.

Preferably, the zoom lens is configured such that a conditional expression (4) $0.42<|f2|/(fw \cdot ft)^{1/2}<0.5$ is satisfied where f2 is the focal distance of the second lens group, fw is the focal distance of the entire lens system in the wide angle end state, and ft is the focal distance of the entire lens system in the telephoto end state. With the zoom lens, a variation of off-axis aberration which appears upon power variation can be further +++corrected favorably.

Preferably, the zoom lens is configured such that a conditional expression (5) $0.8<Dt/Z2<1.2$ is satisfied where Dt is the distance from the aperture stop to that lens face of the fourth lens group which is positioned nearest to the image side along the optical axis in the telephoto end state, and Z2 is the amount of movement of the second lens group when the lens position state varies from the wide angle end state to the telephoto end state. With the zoom lens, further miniaturization and further enhancement in performance can be achieved simultaneously.

According to another embodiment of the present invention, there is provided an image pickup apparatus comprising a zoom lens, and an image pickup element for converting an optical image formed by the zoom lens into an electric signal, the zoom lens including four lens groups including a first lens group having a positive refracting power, a second lens group having a negative refracting power, a third lens group having a positive refracting power and a fourth lens group having a positive refracting power, the first, second, third and fourth lens groups being disposed in order from an object side, the second lens group moving, when a lens position state varies from a wide angle end state to a telephoto end state, to an image side while the fourth lens group moves so as to compensate for a variation of an image plane position caused by the movement of the second lens group whereas the first and third lens groups are fixed in the direction of an optical axis, and an aperture stop disposed on the object side of the third lens group, the third lens group including a negative sub group having a negative refracting power and a positive sub group having a positive refracting power and disposed on the image side of the negative sub group with an air distance left therebetween, the positive sub group being shiftable in a direction substantially perpendicular to the optical axis to shift an image in a direction substantially perpendicular to the optical axis, a conditional expression (1) $1.4<|f3n|/f3<3$ being satisfied where f3n is the focal distance of the negative sub group disposed in the third lens group and f3 is the focal distance of the third lens group.

Also with the image pickup apparatus, the image is shifted and degradation in performance upon image shifting is suppressed by shifting the positive sub group of the third lens group. Further, miniaturization of the zoom lens can be anticipated.

Preferably, the image pickup apparatus further comprises a hand shake detection section for detecting a blur of the image pickup element, a hand shake control section for calculating a blur correction angle for correcting an image blur by the shake of the image pickup element detected by the hand shake detection section and signaling a driving signal for positioning the positive sub group of the third lens group at a position based on the blur correction angle, and a hand shake driving section for receiving the driving signal signaled from the hand shake control section and shifting the positive sub group in a direction perpendicular to the optical axis based on the received driving signal. With the image pickup apparatus, a blur of an image by a shake of the image pickup element by a hand shake or the like can be corrected, and a good focused state can be obtained. Consequently, an image of high quality whose various aberrations are corrected favorably can be acquired by the image pickup apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 22 is a similar view but illustrating lateral aberration in a lens shift state by 0.5 degrees in a telephoto end state of the zoom lens of FIG. 16 according to the numerical value example 3;

FIG. 30 is a block diagram showing an image pickup apparatus to which the present invention is applied.

DETAILED DESCRIPTION OF THE PREFERRED EMBODIMENTS

Figure 1:
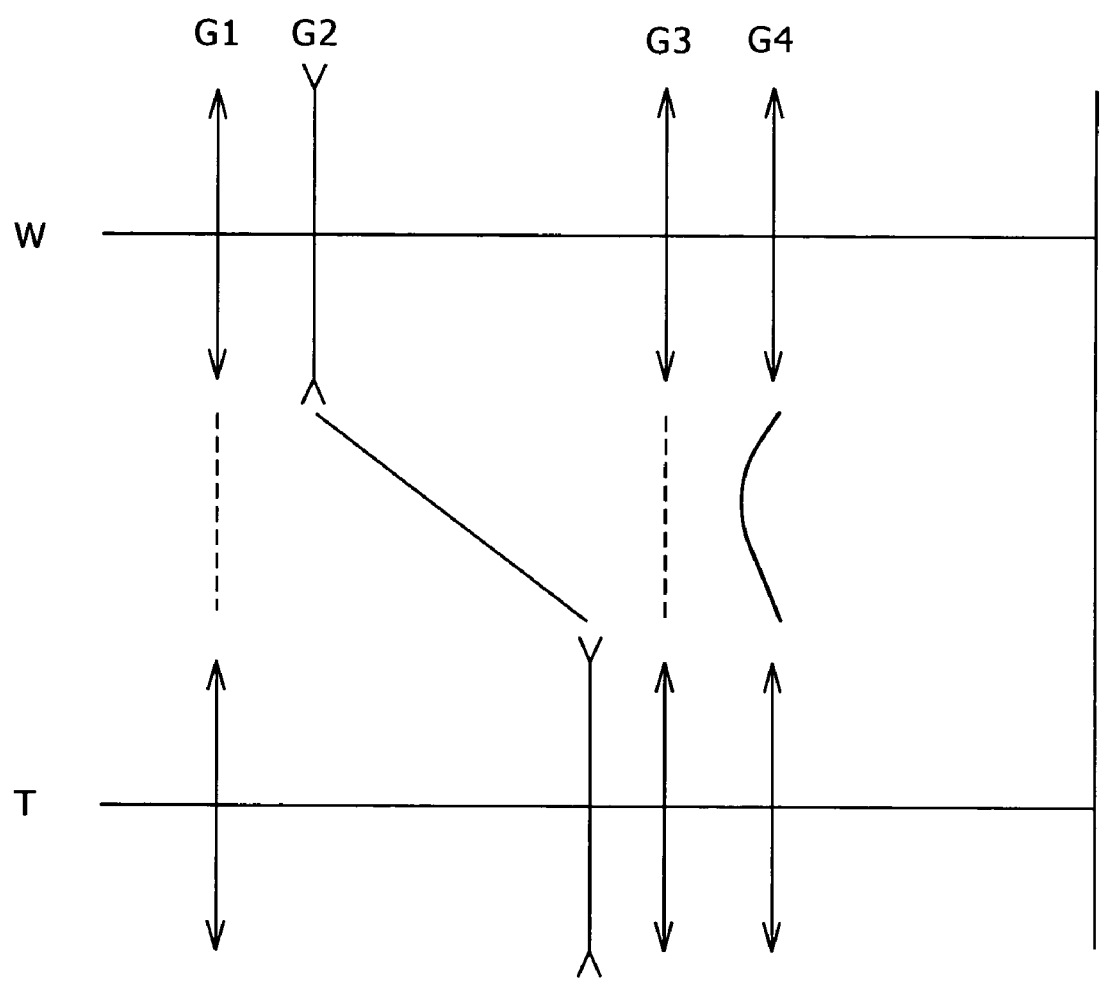
FIG. 1 is a schematic view illustrating a distribution of the refracting power of a zoom lens according to the present invention.

In the following, zoom lenses and an image pickup apparatus to which the present invention are described with reference to the accompanying drawings.

A zoom lens according to the present invention includes four lens groups including a first lens group having a positive refracting power, a second lens group having a negative refracting power, a third lens group having a positive refracting power and a fourth lens group having a positive refracting power, disposed in order from an object side. In the zoom lens, when a lens position state varies from a wide angle end state in which the focal distance of the entire lens system is shortest to a telephoto end state in which the focal distance of the entire lens system is longest, while the first and third lens groups are fixed in the direction of the optical axis, the second lens group moves to the image side to perform a power variation action and the fourth lens group moves to perform a compensation action for the variation of the image plane position caused by the movement of the second lens group and a short distance focusing action.

The third lens group includes a negative sub group having a negative refracting power and a positive sub group having a positive refracting power and disposed on the image side of the negative sub group. The positive sub group is shiftable in a direction substantially perpendicular to the optical axis to shift an image in a direction substantially perpendicular to the optical axis, The zoom lens having the configuration described above can suppress degradation in performance which occurs upon image shifting while the power variation ratio is high by configuring the zoom lens in the following manner.

In particular:

(A) an aperture stop is disposed on the object side of the third lens group; and (B) the refracting power of the negative sub group is set appropriately.

The position of the aperture stop is very important in order to achieve a good balance between enhancement of the performance and miniaturization.

Since an off-axis light flux which passes a lens group away spaced from the aperture stop passes remotely from the optical axis, where the aperture stop is disposed in the proximity of the center of the lens system, it is most ready to decrease the lens diameters of the lens groups. Particularly since the first lens group is positioned farthest away from the image plane position, it is liable to have a large lens diameter, and therefore, it is preferable to dispose the aperture stop at a position rather near to the object side from the center of the lens system.

Further, when the lens position state varies, the height of an off-axis light flux which passes the movable lens groups varies by a great amount. Therefore, the variation in height can be varied to favorably correct the variation of the off-axis aberration which appears when the lens position state varies. Particularly if one or more movable lens groups are disposed on each of the object side and the image side of the aperture stop, then aberration correction can be performed better as much.

From the foregoing, with the zoom lens of the present invention, the aperture stop is disposed on the object side of the third lens group, and consequently, the lens diameter of the first lens group which is liable to have a large lens diameter can be suppressed to a low value and besides enhancement of the performance can be anticipated.

It is to be noted that, in the zoom lens of the present invention, where the position of the aperture stop is fixed in the direction of the optical axis, the iris mechanism can be fixed in the direction of the optical axis and simplification of the lens barrel structure can be anticipated.

While the third lens group in the zoom lens of the present invention is formed from the negative sub group and the positive sub group, the refracting power of the negative sub group is significant where it is intended to reduce the lens diameter.

As the refracting power of the negative sub group increases, an off-axis light flux which passes the positive sub group is spaced away from the optical axis, which leads to increase of the lens diameter of the positive sub group and hence to increase of the weight, resulting in increase in size and complication of a shift driving mechanism for shifting the positive sub group. Simultaneously, since also an off-axis light flux which passes the fourth lens group is spaced away from the optical axis, increase in size and complication also of a driving mechanism for the focusing group are invited, resulting in difficulty to achieve miniaturization.

Therefore, in the zoom lens of the present invention, reduction of the lens diameter can be achieved suitably by adequately setting the focal distance of the negative sub group with respect to the focal distance of the third lens group.

From the point of view described above, it is significant for a conditional expression (1)

$$1.4 < |f3n|/f3 < 3 \qquad (1)$$

to be satisfied where f3n is the focal distance of the negative sub group disposed in the third lens group and f3 is the focal distance of the third lens group.

This conditional expression (1) defines the focal distance of the negative sub group in the third lens group.

Where the focal distance of the negative sub group is shorter than the lower limit of the conditional expression (1), since also the refracting power of the positive sub group has a higher value as described above, a main light flux which passes the positive sub group is spaced away from the optical axis, and consequently, the amount of peripheral light becomes insufficient.

On the contrary where the focal distance of the negative sub group is longer than the upper limit value of the conditional expression (1), an off-axis light flux which passes the first lens group is spaced away from the optical axis and the variation of the amount of peripheral light when the shift lens group (positive sub group of the third lens group) is shifted is great.

It is to be noted that, in the zoom lens of the present invention, in order to achieve further enhancement of the performance, the upper limit value of the conditional expression (1) is preferably set to 2.5. If the value of the conditional expression (1) exceeds 2.5, then since an off-axis light flux which passes the fourth lens group is spaced away from the optical axis, coma which appears at peripheral portions of a screen cannot be corrected better, and it is difficult to achieve a higher optical performance.

In a zoom lens having a high power variation ratio, it is necessary to achieve better correction of the variation of coma which appears when the shift lens group is shifted particularly in a telephoto end state. In other words, it is important (C) to form the air distance between the negative sub group and the positive sub group in a suitable form.

Therefore, in the zoom lens of the present invention, the variation of the coma is corrected favorably by decreasing the variation of the optical path length which arises when the shift lens group is shifted.

In particular, the distance between the radius of curvature of that lens face of the negative sub group which is positioned nearest to the image side and the radius of curvature of that lens face of the positive sub group which is positioned nearest to the object side is reduced thereby to form the air distance between the negative sub group and the positive sub group in a suitable form to correct the variation of the coma well.

To this end, the zoom lens of the present invention is configured preferably such that a conditional expression (2)

$$-0.3 < (Rn+Rp)/(Rn-Rp) < 0.3 \quad (2)$$

is satisfied where Rn is the radius of curvature of that lens face of the negative sub group disposed in the third lens group which is positioned nearest to the image side and Rp is the radius of curvature of that lens face of the positive sub group disposed in the third lens group which is positioned nearest to the object side.

As described above, the conditional expression (2) defines the air distance formed between the negative sub group and the positive sub group.

Where the ratio defined in the conditional expression (2) is lower than the lower limit value of the condition expression (2), it is difficult to favorably correct eccentric coma which appears at peripheral portions of a screen when the positive sub group is shifted in a telephoto end state. On the contrary, where the ratio defined in the conditional expression (2) is higher than the upper limit value of the condition expression (2), the variation of coma which appears at peripheral portions of a screen when the positive sub group is shifted in a telephoto end state becomes excessively great, resulting in failure in achievement of a good optical performance.

In the zoom lens of the present invention, preferably the negative sub group from between the two sub groups which form the third lens group includes at least one positive lens and a negative lens while the positive sub group includes at least two positive lenses and one positive lens.

In order to favorably correct the variation of various aberrations which appear when the positive sub group is shifted, it is necessary to suppress the spherical aberration appearing in each of the negative sub group and the positive sub group to some degree.

In the zoom lens of the present invention, the refracting power of the negative sub group in the third lens group is lower than the positive sub group as indicated by the conditional range of the conditional expression (1) given hereinabove. Since the refracting index of the negative sub group is low, it is possible to favorably correct positive spherical aberration which appears solely in the negative sub group in the doublet configuration. Meanwhile, the positive sub group is formed in a triplet configuration which includes three lenses of a positive lens, a negative lens and another positive lens. By the triplet configuration, negative spherical aberration which appears solely in the positive sub group can be corrected well.

In order to favorably correct the variation of the coma caused by the variation of the angle of view, preferably the zoom lens of the present invention is configured such that a conditional expression (3)

$$0 < (Rp1+Rp2)/(Rp1-Rp2) < 2 \quad (3)$$

is satisfied where Rp1 is the radius of curvature of an object side lens face of that one of the positive lens groups of the positive sub group which is positioned nearest to the image side and Rp2 is the radius of curvature of an image side lens face of that one of the positive lenses of the positive sub group which is positioned nearest to the image side.

The conditional expression (3) defines the shape of that one of the positive lenses of the positive sub group which is disposed nearest to the image side.

Where the ratio in the conditional expression (3) is lower than the lower limit value of the conditional expression (3), a negative image plane distortion cannot be corrected well, and an image forming performance which is good also at peripheral portions of a screen cannot be obtained.

On the other hand, where the ratio in the conditional expression (3) is higher than the upper limit value of the conditional expression (3), internal coma which appears at peripheral portions of a screen cannot be corrected well, and an image forming performance which is good also at peripheral portions of a screen cannot be obtained.

In the zoom lens of the present invention, since the second lens group is only one negative lens group, in order to more favorably correct the variation of off-axis aberration which appears upon power variation, it is important to set the refracting power of the second lens group appropriately. Thus, the zoom lens is configured preferably such that a conditional expression (4)

$$0.42 < |f2|/(fw \cdot ft)^{1/2} < 0.5 \quad (4)$$

is satisfied where f2 is the focal distance of the second lens group, fw is the focal distance of the entire lens system in the wide angle end state, and ft is the focal distance of the entire lens system in the telephoto end state.

The conditional expression (4) defines the focal distance of the second lens group.

Where the ratio in the conditional expression (4) is higher than the upper limit value of the conditional expression (4), an off-axis light flux which passes the second lens group is spaced away from the optical axis by a great amount. As a result, it is difficult to favorably correct coma which appears at peripheral portions of a screen in a wide angle end state.

On the contrary, where the ratio in the conditional expression (4) is lower than the lower limit value of the conditional expression (4), it is difficult to favorably correct the variation of off-axis aberration which appears when the lens position state varies.

In the zoom lens of the present invention, in order to achieve reduction of the total length of the lens system and reduction of the lens diameter of the first lens group, a countermeasure is taken so that an off-axis light flux which passes the first lens group passes in the proximity of the optical axis particularly in a telephoto end state.

While a variation of the angle of view appears when the positive sub group is shifted, since the angle of view is narrow particularly in a telephoto end state, the variation of the angle of view is great, and as a result, eclipse by the lens outer diameter of the first lens group is liable to occur thereby to cause shortage of the amount of peripheral light. Therefore, in order to reduce the lens diameter of the first lens group, it is important to cause an off-axis light flux which passes the first lens group to pass in the proximity of the optical axis.

In particular, in the zoom lens of the present invention, the angle defined by a main light flux which passes the position of the aperture stop and the optical axis is set to a small angle so that an off-axis light flux which passes the first lens group passes in the proximity of the optical axis.

In an optical system for three-imager image pickup wherein a color separation prism is disposed on the image side of the optical system, an image side telecentric optical system whose exit pupil position is near to the infinity is used principally.

Therefore, as the distance from the aperture stop to the image plane position increases, the refracting power of the lens groups disposed on the image side with respect to the aperture stop decreases, and as a result, the angle defined by the main light flux and the optical axis can be reduced. As the angle defined by the main light flux and the optical axis decreases, an off-axis light flux incident to the first lens group passes nearer to the optical axis.

However, as the distance from the aperture stop to the image plane position increases, the position of the aperture stop approaches the object side and the space for movement of the second lens group upon power variation decreases. Consequently, it is necessary to increase the refracting power of the first lens group and the second group. Therefore, the variation of the off-axis aberration which appears when the lens position state varies cannot be suppressed, and sufficient enhancement of the performance cannot be achieved.

In order to achieve further miniaturization and further enhancement of the performance simultaneously, the zoom lens of the present invention is configured preferably such that a conditional expression (5)

$$0.8 < Dt/Z2 < 1.2 \quad (5)$$

is satisfied where Dt is the distance from the aperture stop to that lens face of the fourth lens group which is positioned nearest to the image side along the optical axis in the telephoto end state, and Z2 is the amount of movement of the second lens group when the lens position state varies from the wide angle end state to the telephoto end state.

The conditional expression (5) defines the distance from the aperture stop to the fourth lens group in a telephoto end state and the amount of movement of the second lens group.

Where the ratio in the conditional expression (5) is higher than the upper limit of the conditional expression (5), it is difficult to favorably correct the variation of off-axis aberration appearing in the second lens group when the level position state varies to achieve further enhancement of the performance.

On the contrary, where the ratio in the conditional expression (5) is lower than the lower limit of the conditional expression (5), the composite focal distance of the third lens group and the fourth lens group becomes excessively short. As a result, the angle defined by a main light flux and the optical axis becomes excessively great, and it becomes difficult to reduce the lens diameter of the first lens group.

Incidentally, in the zoom lens of the present invention, it is preferable for an on-axis light flux to exit in a divergent state from the negative sub group disposed in the third lens group. In other words, it is preferable to set the lateral magnification of the positive sub group disposed in the third lens group to a negative value.

Where the lateral magnification of the positive sub group in the third lens group is represented by $\beta a$ and the lateral magnification of the fourth lens group is represented by $\beta b$, the blur correction coefficient $\beta s$ and the focusing sensitivity $\beta f$ are represented respectively by $$\beta s = (1-\beta a)\beta b$$

$$\beta f = (1-\beta a^2)\beta b^2$$

In the zoom lens of the present invention, by setting the lateral magnification $\beta a$ of the positive sub group so that $\beta a < 0$ is satisfied, it is possible to raise the blur correction coefficient $\beta s$ and lower the focusing sensitivity $\beta f$ thereby to make it possible to shift an image by a small lens shift amount while the power variation ratio is high and to lower the positional accuracy in the direction of the optical axis.

If the positioning accuracy in the direction of the optical axis is raised, then since it becomes necessary to hold the shift lens group, that is, the positive sub group, in a state wherein it is biased in the direction of the optical axis, complication of a driving mechanism for shifting the positive sub group in a direction perpendicular to the optical axis is invited. Therefore, in the zoom lens of the present invention, the positional accuracy in the direction of the optical axis is lowered and the lens barrel structure is simplified by setting the lateral magnification of the positive sub group in such a manner as described hereinabove.

In the zoom lens of the present invention, in order to achieve further enhancement of the performance, the first lens group is formed from four lenses including a cemented lens of a negative lens and a positive lens and two positive lenses disposed in order from the object side.

In the first lens group, negative spherical aberration is likely to occur particularly in a telephoto end state because an on-axis light flux is incident with a great light flux diameter. Further, since an off-axis light flux is incident remotely from the optical axis, off-axis aberration is likely to occur.

However, in the zoom lens of the present invention, negative spherical aberration and on-axis chromatic aberration are corrected well by disposing the cemented lens of a negative lens and a positive lens nearest to the object side of the first lens group. Further, while the first lens group in the conventional zoom lens of a four-group configuration having positive, negative, positive and positive groups is formed from a cemented lens and a positive lens positioned on the image side of the cemented lens, where two positive lenses are used, although the power variation ratio is high, it is possible to suppress occurrence of negative spherical aberration in a telephoto end state and favorably correct the variation of coma which appears upon variation of the angle of view. Consequently, a high optical performance can be achieved.

In the zoom lens of the present invention, in order to more favorably correct various aberrations appearing in the second lens group to achieve a higher optical performance, preferably the second lens group is formed from four lenses including a negative lens of a meniscus shape having a concave face directed to the image side, a negative lens, another positive lens and another negative lens disposed in order.

Since the second lens group takes charge of a power variation action, it is important to favorably correct various aberrations appearing in the second lens group in order to achieve further enhancement of the performance. In the zoom lens of the present invention, the negative lens of a meniscus lens shape disposed nearest to the object side in the second lens group and having a concave face directed to the image side takes charge of a role of correcting the variation of coma which appears upon variation of the angle of view in a wide angle end state while the triplet lens disposed on the image side of the negative lens takes charge of a role of favorably correcting on-axis aberration. In this manner, the roles of the lenses of the second lens group in aberration correction are allocated separately so that a good image forming performance can be achieved.

It is to be noted that, in the zoom lens of the present invention, since performance degradation by eccentricity of the positive lenses of the triplet lens and the negative lens disposed on the image side of the positive lenses is significant, they are cemented to reduce the influence of the eccentricity error upon manufacture thereby to obtain stabilized optical quality.

In the zoom lens of the present invention, in order to favorably correct the variation of various aberrations which appear upon variation of the subject position, the fourth lens group includes a positive lens having a convex face directed to the object side, a negative lens having a concave face directed to the image side and another positive lens having a convex face directed to the object side, disposed in order from the object side.

Where the fourth lens group is formed in a triplet configuration, it is possible to correct off-axis aberration and on-axis aberration at the same time, and the variation of various aberrations which appears when the subject position varies can be corrected favorably.

It is to be noted that, in the zoom lens of the present invention, in order to favorably suppress occurrence of chromatic aberration, it is preferable to use a glass material having a high anomalous dispersion for the first lens group.

Particularly, where the positive lens in the cemented lens from among the lenses which compose the first lens group is made of a glass material having a high anomalous dispersion, a second-order dispersion which appears at a central portion of a screen in a telephoto end state can be corrected favorably.

Further, where one of the two positive lenses disposed on the image side of the first lens group is made of a glass material of a low dispersion whose Abbe number is higher than 65, chromatic aberration of magnification which appears at peripheral portions of a screen in a telephoto end state can be corrected favorably. Further, where both of the two positive lenses described above are made of a glass material having a low dispersion, the chromatic aberration of magnification can be corrected more favorably.

In the zoom lens of the present invention, since an aspheric lens is used, a higher optical performance can be implemented. Particularly by introducing an aspheric face into the final lens group, further enhancement of a central performance can be anticipated. Further, where an aspheric lens is used for the second lens group, also it is possible to favorably correct the variation of coma which is caused by the angle of view which appears in a wide angle end state.

Naturally, a higher optical performance can be obtained by using a plurality of aspheric faces.

Naturally, also it is possible to dispose a low-pass filter on the image side of the lens system in order to prevent appearance of moire fringes or dispose an infrared ray cutting filter in response to a spectral sensitivity characteristic of the light receiving element.

In the following, zoom lenses of several embodiments of the present invention and several numerical value examples are described.

It is to be noted that, while an aspheric face is used in the zoom lenses of the embodiments, the aspheric face shape is represented by the following expression:

$$x = cy^2/(1+(1-(1+\kappa)c^2y^2)^{1/2}) + Ay^4 + By^6 +$$

where y is the height from the optical axis, x the amount of sag, c the curvature, κ the conical constant, and A, B, . . . represent aspheric constants.

FIG. 1 illustrates a refracting power distribution of the zoom lens of the present invention. Referring to FIG. 1, the zoom lens includes a first lens group G1 having a positive refracting power, a second lens group G2 having a negative refracting power, a third lens group G'having a positive refracting power and a fourth lens group G4 having a positive refracting power, disposed in order from the object side. Upon power variation from a wide angle end state (W) illustrated at an upper stage in FIG. 1 to a telephoto end state (T) illustrated at a lower stage in FIG. 1, the second lens group G2 moves to the image side (refer to a solid line at an intermediate stage in FIG. 1) such that the air distance between the first lens group G1 and the second lens group G2 increases while the air distance between the second lens group G2 and the third lens group G3 decreases. At this time, the first lens group G1 and the third lens group G3 are fixed (refer to the broken line at an intermediate stage in FIG. 1), and the fourth lens group G4 moves so as to correct the variation of the image plane position caused by the movement of the second lens group G2. Further, upon focusing at a short distance, the fourth lens group G4 moves to the object side (refer to a solid line at an intermediate stage in FIG. 1).

Figure 2:
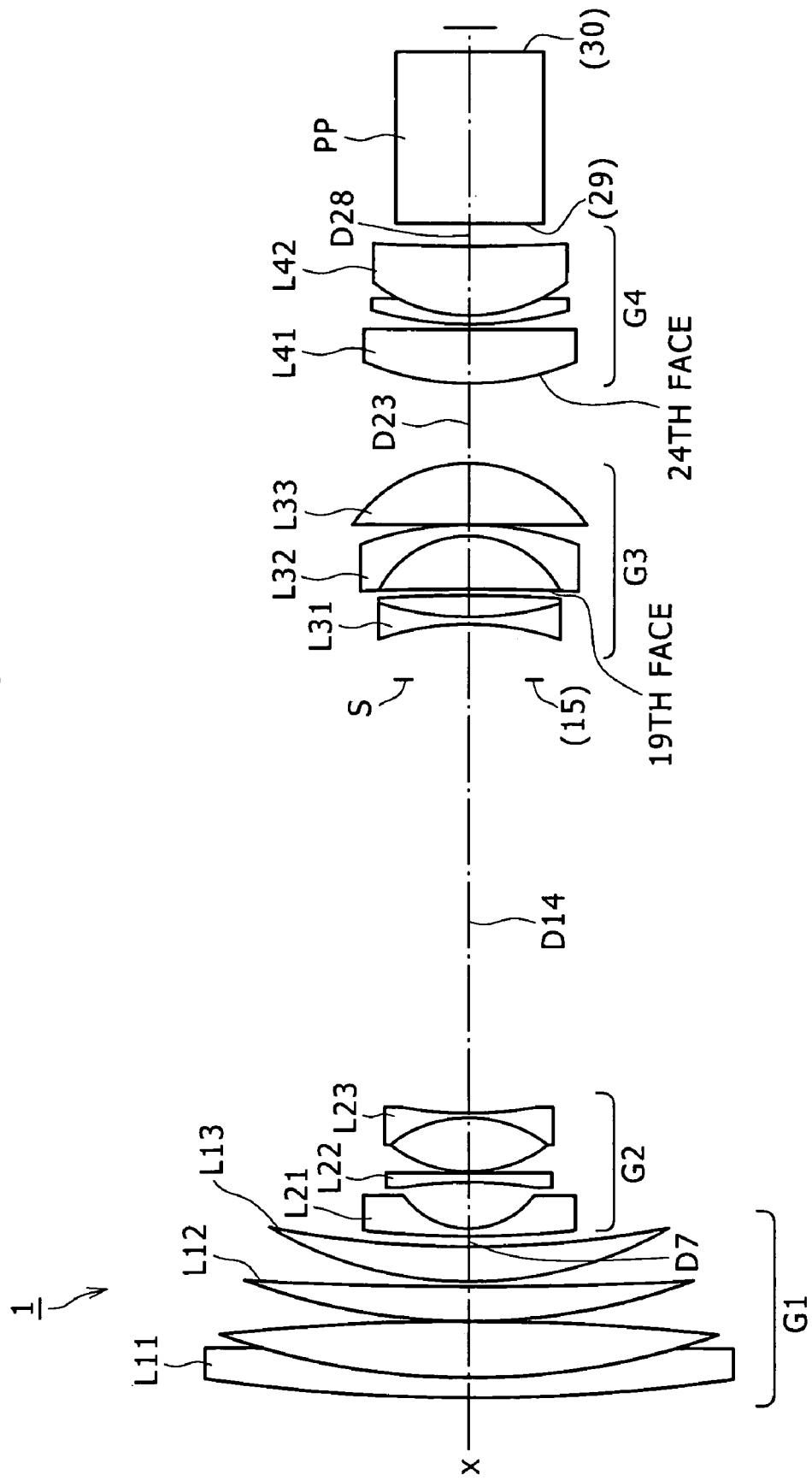
FIG. 2 is a schematic view showing a configuration of a zoom lens to which the present invention is applied.

FIG. 2 shows a lens configuration of a zoom lens according to a first embodiment of the present invention. Referring to FIG. 2, the first lens group G1 includes a cemented lens L11 of a negative lens of a meniscus shape having a convex face directed to the object side and a positive lens having a convex face directed to the object side, a positive lens L12 having a convex face directed to the object side, and a positive lens L13 having a convex face directed to the object side. The second lens group G2 includes a negative lens L21 of a meniscus shape having a concave face directed to the image side, a negative lens L22 having a biconcave shape, and a cemented lens L23 of a biconvex lens and a biconcave lens. The third lens group G3 includes a cemented negative lens L31 of a biconcave lens and a positive lens having a convex face directed the object side, a cemented lens L32 of a biconvex lens having an aspheric face on the object side and a negative lens having a concave face directed to the object side, and a positive lens L33 having a convex face directed to the image side. The fourth lens group G4 includes a positive lens L41 having a convex face directed to the object side, and a cemented lens L42 of a negative lens having an aspheric face on the object side and having a concave face directed to the image side and a positive lens having a convex face directed to the object side.

In the zoom lens 1 of the first embodiment, the cemented negative lens L31 disposed in the third lens group G3 forms a negative sub group and the cemented lens L32 and the positive lens L33 in the third lens group G3 form a positive sub group. Then, the positive sub group L32 and L33 is shifted in a direction substantially perpendicular to the optical axis x to shift an image in a direction substantially perpendicular to the optical axis x.

In the zoom lens 1, a color separation prism PP is disposed on the image side of the fourth lens group G4 fixedly in the direction of the optical axis. Meanwhile, an aperture stop S is disposed on the image side of the third lens group G3 and is fixed in the direction of the optical axis together with the third lens group G3 when the lens position state varies.

Numerical values of various dimensions of a numerical value example 1 wherein particular numerical values are applied to the zoom lens of the first embodiment are indicated in Table 1 below. In dimensional tables of the numerical value example 1 and the other numerical value examples hereinafter described, "Face number" indicates the ith face as counted from the object side; "Radius of curvature" indicates the radius of curvature of the ith optical face; "Face distance" indicates the on-axis face distance between the ith optical face and the i+1th optical face as counted from the object side; "Refractive index" indicates the refractive index of the glass material having the ith optical face on the object side with regard to the d-line ($\lambda$=587.6 nm), and "Abbe number" indicates the Abbe number of the glass material having the ith optical face on the object side with regard to the d-line. Further, "Di" represents that the face distance is a variable distance; the radius of curvature of 0 represents that the face is a flat face; and Bf represents that the face distance is a back focus distance.

TABLE 1

| Face No. | Radius of curvature | Face distance | Refractive index | Abbe No. |
|---|---|---|---|---|
| 1: | 39.2166 | 0.490 | 1.80518 | 25.4 |
| 2: | 16.7652 | 1.224 | 1.49700 | 81.6 |
| 3: | −65.2680 | 0.049 | | |
| 4: | 14.0159 | 0.805 | 1.60300 | 65.5 |
| 5: | 53.5272 | 0.049 | | |
| 6: | 8.9488 | 0.869 | 1.45600 | 90.3 |
| 7: | 21.2457 | (D7) | | |
| 8: | 14.2665 | 0.171 | 1.77250 | 49.6 |
| 9: | 1.9759 | 1.060 | | |
| 10: | −9.6223 | 0.147 | 1.88300 | 40.8 |
| 11: | 16.5840 | 0.049 | | |
| 12: | 3.2143 | 1.204 | 1.75520 | 27.5 |
| 13: | −3.4351 | 0.147 | 1.88300 | 40.8 |
| 14: | 7.0292 | (D14) | | |
| 15: | 0.0000 | 1.258 | | (Aperture stop) |

TABLE 1-continued

| Face No. | Radius of curvature | Face distance | Refractive index | Abbe No. |
|---|---|---|---|---|
| 16: | −6.4419 | 0.147 | 1.77520 | 27.5 |
| 17: | 6.1177 | 0.490 | 1.92286 | 18.9 |
| 18: | −28.9059 | 0.147 | | |
| 19: | 22.9615 | 1.224 | 1.58913 | 61.3 |
| 20: | −2.3573 | 0.208 | 1.88300 | 40.8 |
| 21: | −9.1346 | 0.073 | | |
| 22: | −682.9045 | 1.322 | 1.49700 | 81.6 |
| 23: | −3.3001 | (D23) | | |
| 24: | 5.6392 | 1.224 | 1.69350 | 53.3 |
| 25: | 59.9742 | 0.132 | | |
| 26: | 8.3984 | 0.147 | 1.80518 | 25.4 |
| 27: | 3.6547 | 1.664 | 1.48749 | 70.4 |
| 28: | 48.9503 | (D28) | | |
| 29: | 0.0000 | 3.806 | 1.51680 | 64.2 |
| 30: | 0.0000 | (Bf) | | |

In the zoom lens 1, when the lens position state varies from a wide angle end state to a telephoto end state, the distance D7 between the first lens group G1 and the second lens group G2, the distance D14 between the second lens group G2 and the aperture stop S, the distance D23 between the third lens group G3 and the fourth lens group G4 and the distance D28 between the fourth lens group G4 and the color separation prism PP vary. Therefore, the values of the face distances in the numerical value example 1 in the wide angle end state, in an intermediate focal length state between the wide angle end and the telephoto end and in the telephoto end state are indicated in Table 2 below together with those of the focal length f, F number Fno. and angle of view 2ω.

TABLE 2

| f | 1.000~ | 9.430~ | 21.047 |
|---|---|---|---|
| FNO | 1.65~ | 2.19~ | 2.08 |
| 2ω | 60.34~ | 6.70~ | 3.00° |
| D7 | 0.184 | 8.319 | 9.636 |
| D14 | 10.033 | 1.898 | 0.581 |
| D23 | 1.850 | 0.755 | 1.958 |
| D28 | 0.437 | 1.532 | 0.329 |
| Bf | 0.566 | 0.566 | 0.566 |

The 19th face and the 24th face in the zoom lens 1 are each formed from an aspheric face. Therefore, fourth-, sixth-, eighth- and tenth-order aspheric coefficients A, B, C and D of the aspheric faces in the numerical value example 1 are indicated in Table 3 below together with the constant κ of the cone. It is to be noted that, in Table 3 and succeeding tables in which an aspheric coefficient is indicated, "E-i" is an exponential expression wherein the base is 10, that is, "$10^{-i}$", and for example, "0.12345E−05" represents "$0.12345 \times 10^{-5}$".

TABLE 3

| 19th face | κ = −2.000000 | A = −0.347142E−02 | B = −0.447320E−03 | C = 0.545089E−04 |
|---|---|---|---|---|
| | | D = −0.255876E−04 | | |
| 24th face | κ = −0.540914 | A = −0.360175E−03 | B = −0.558377E−05 | C = −0.185402E−06 |
| | | D = 0.316210E−06 | | |

Corresponding values to the conditional expressions (1), (2), (3), (4) and (5) of the numerical value example 1 described hereinabove are indicated in Table 4 below:

TABLE 4 f3n = −17.671
f3 = 8.877
f2 = −2.195
(1) |f3n|/f3 = 1.991
(2) (Rn + Rp)/(Rn − Rp) = 0.115
(3) (Rp1 + Rp2)/(Rp1 − Rp2) = 1.010
(4) |f2|/(fw · ft)$^{1/2}$ = 0.479
(5) Dt/Z2 = 1.057

Figure 3:
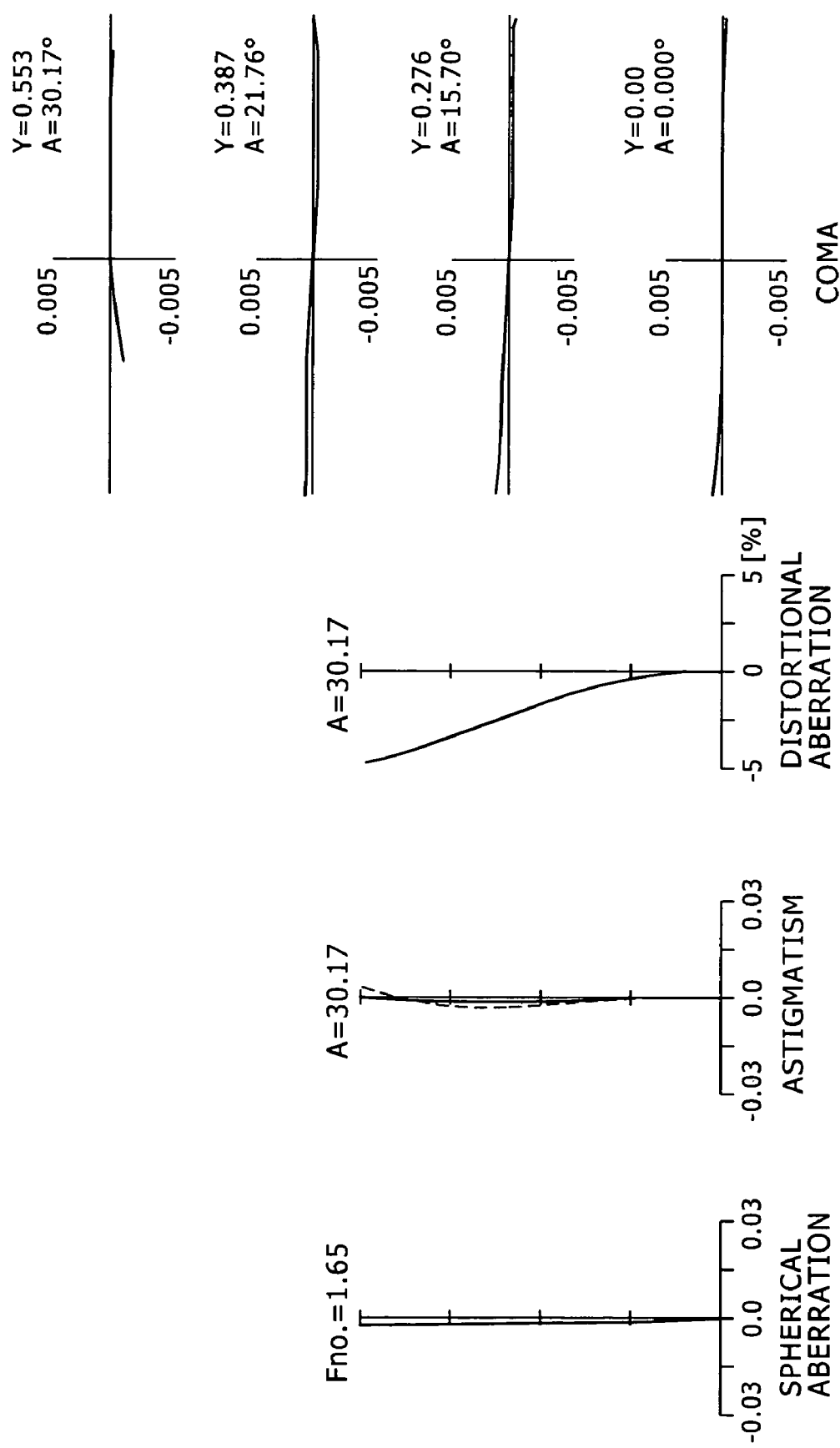
FIG. 3 is a diagrammatic view illustrating spherical aberration, astigmatism, distortional aberration and coma in a wide angle end state of the zoom lens of FIG. 2 according to a numerical value example 1 wherein particular numerical values are applied to the zoom lens.
Figure 4:
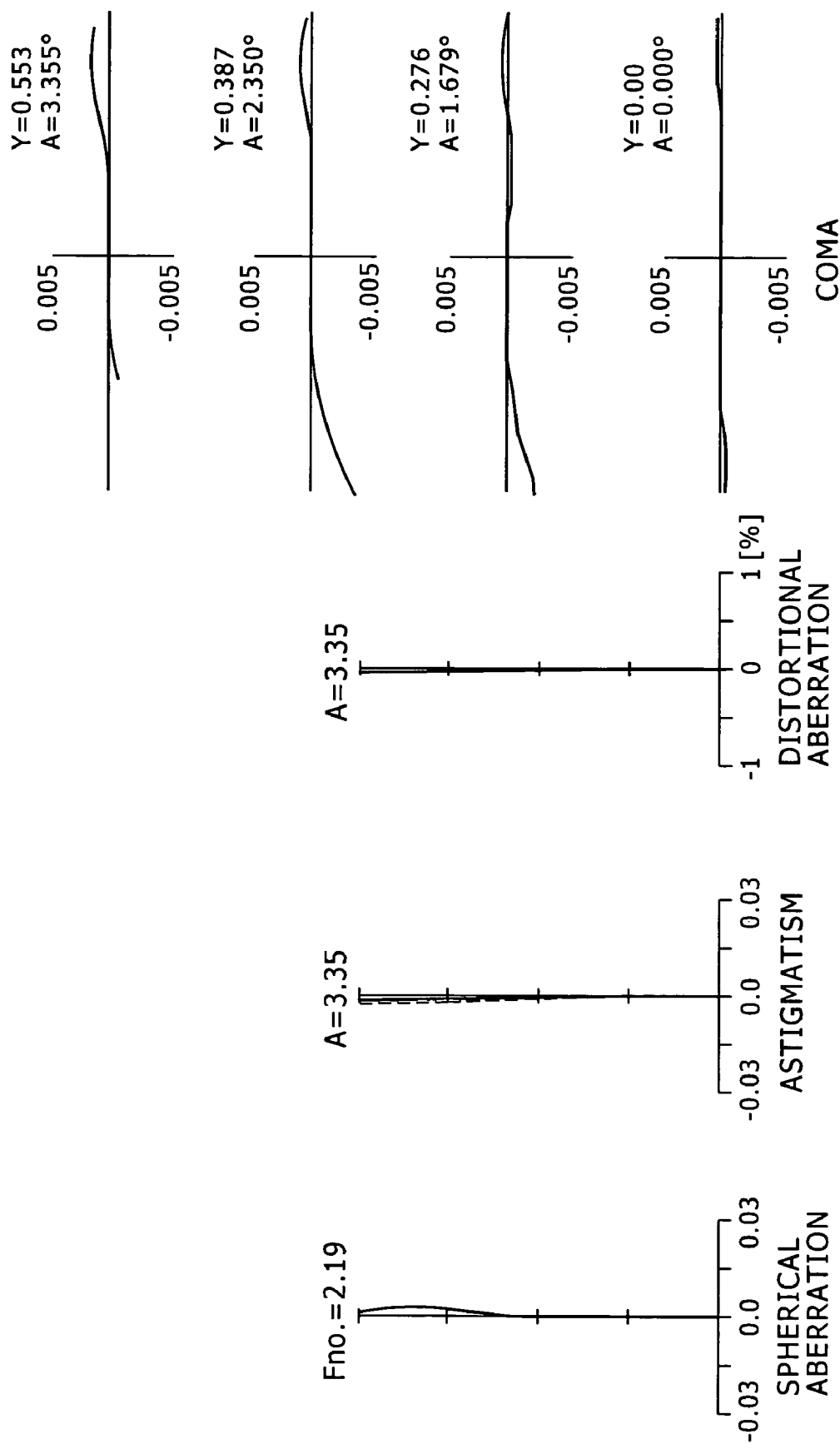
FIG. 4 is a similar view but illustrating spherical aberration, astigmatism, distortional aberration and coma in an intermediate focal length state of the zoom lens of FIG. 2 according to the numerical value example 1.
Figure 5:
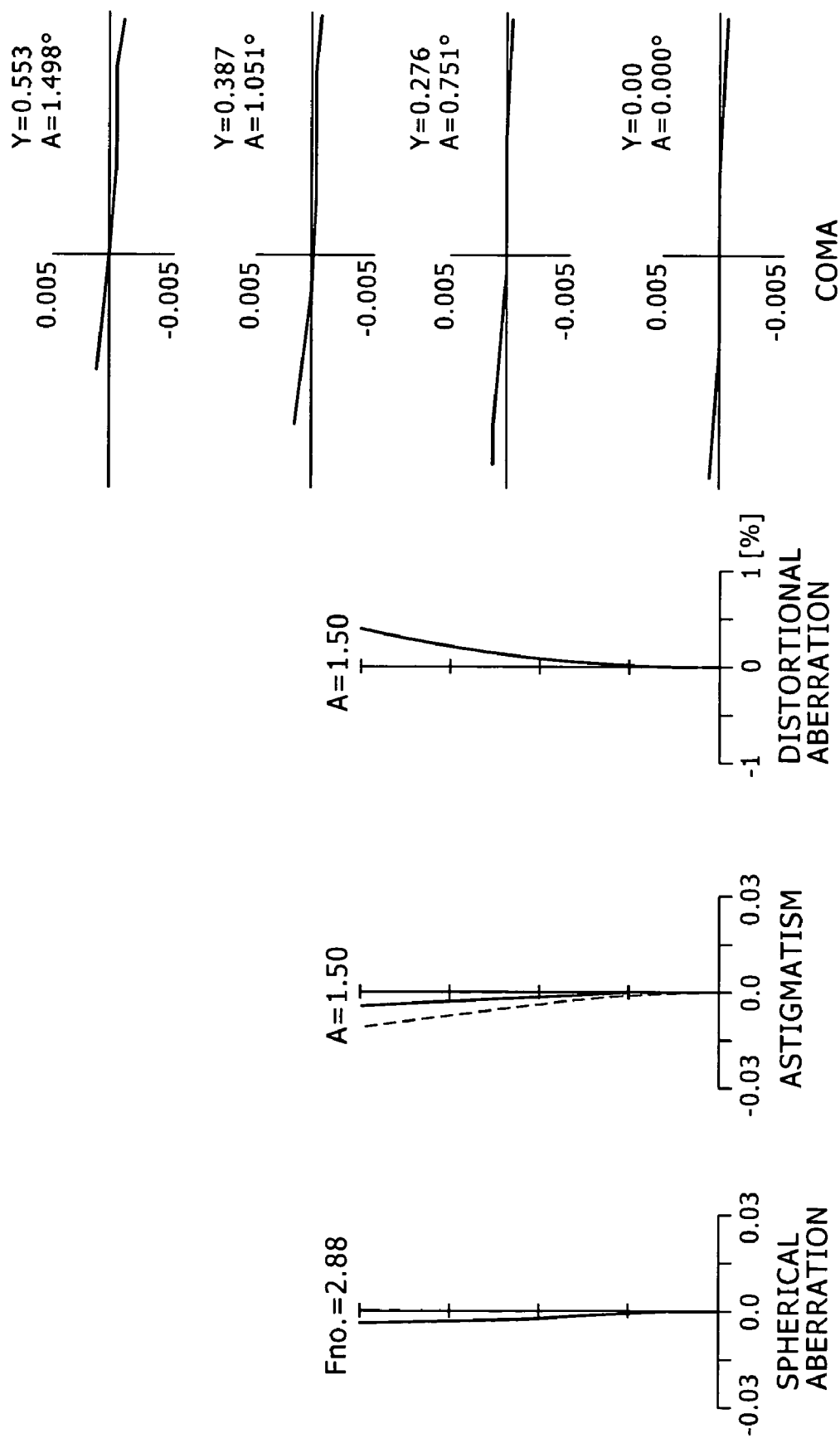
FIG. 5 is a similar view but illustrating spherical aberration, astigmatism, distortional aberration and coma in a telephoto end state of the zoom lens of FIG. 2 according to the numerical value example 1.

FIGS. 3 to 5 illustrate various aberrations in a focused state on infinity in the numerical value example 1. Particularly, FIG. 3 illustrates various aberrations in a wide angle end state (f=1.000); FIG. 4 illustrates various aberrations in an intermediate focal length state (f=9.430); and FIG. 5 illustrates various aberrations in a telephoto end state (f=21.047).

In the aberration diagrams of FIGS. 3 to 5, a solid line in a spherical aberration diagram indicates spherical aberration, and a solid line in an astigmatism diagram indicates a sagittal image plane and a broken line indicates a meridional image plane. In a coma diagram, y indicates an image height. Further, in the aberration diagrams, Fno. represents an F number, and A represents a half angle of view.

Figure 6:
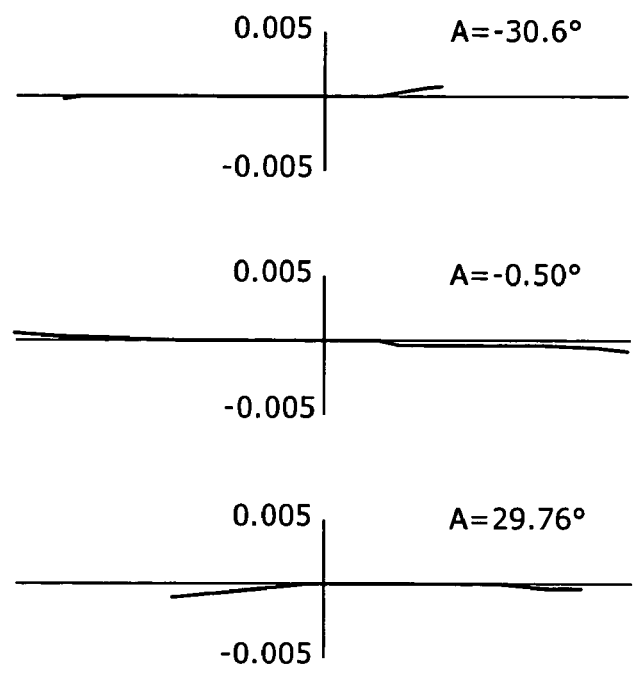
FIG. 6 is a diagrammatic view illustrating lateral aberration in a lens shift state by 0.5 degrees in a wide angle end state of the zoom lens of FIG. 2 according to the numerical value example 1.
Figure 7:
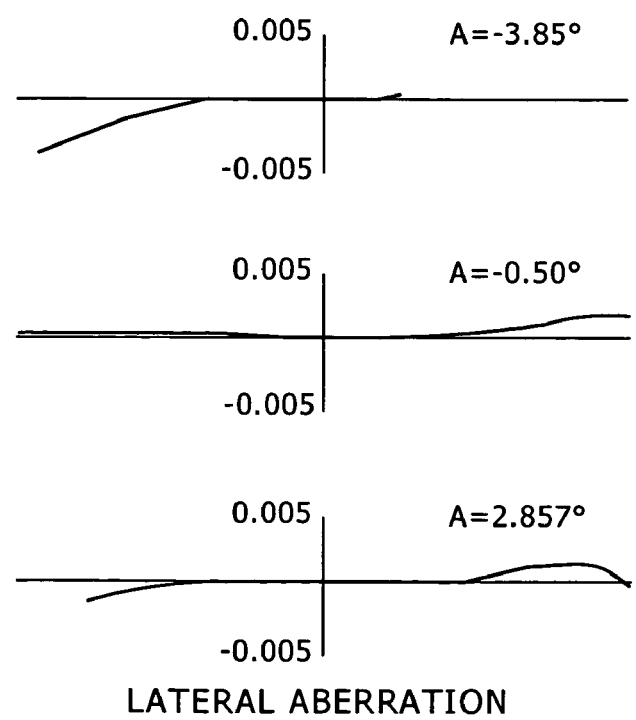
FIG. 7 is a similar view but illustrating lateral aberration in a lens shift state by 0.5 degrees in an intermediate focal length state of the zoom lens of FIG. 2 according to the numerical value example 1.
Figure 8:
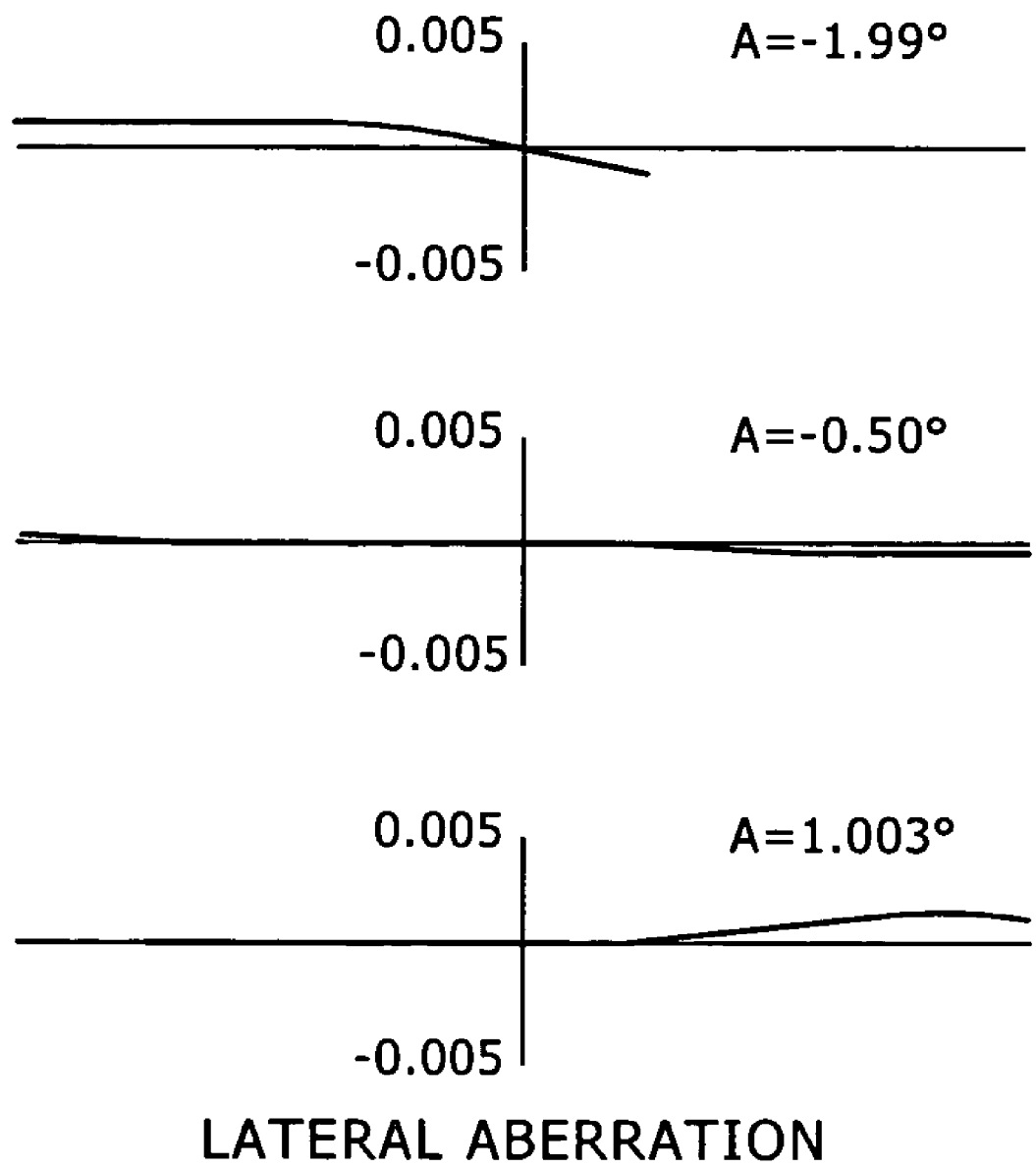
FIG. 8 is a similar view but illustrating lateral aberration in a lens shift state by 0.5 degrees in a telephoto end state of the zoom lens of FIG. 2 according to the numerical value example 1.

FIGS. 6 to 8 illustrate lateral aberration in a lens shift state corresponding to 0.5 degrees in a focused state on infinity in the numerical value example 1. Particularly, FIG. 6 illustrates lateral aberration in a wide angle end state (f=1.000) of the zoom lens; FIG. 7 illustrates lateral aberration in an intermediate focal length state (f=9.430); and FIG. 8 illustrates lateral aberration in a telephoto end state (f=21.047).

It can be seen apparently from the aberration diagrams that the numerical value example 1 indicates favorably corrected aberrations and has a superior image forming property.

Figure 9:
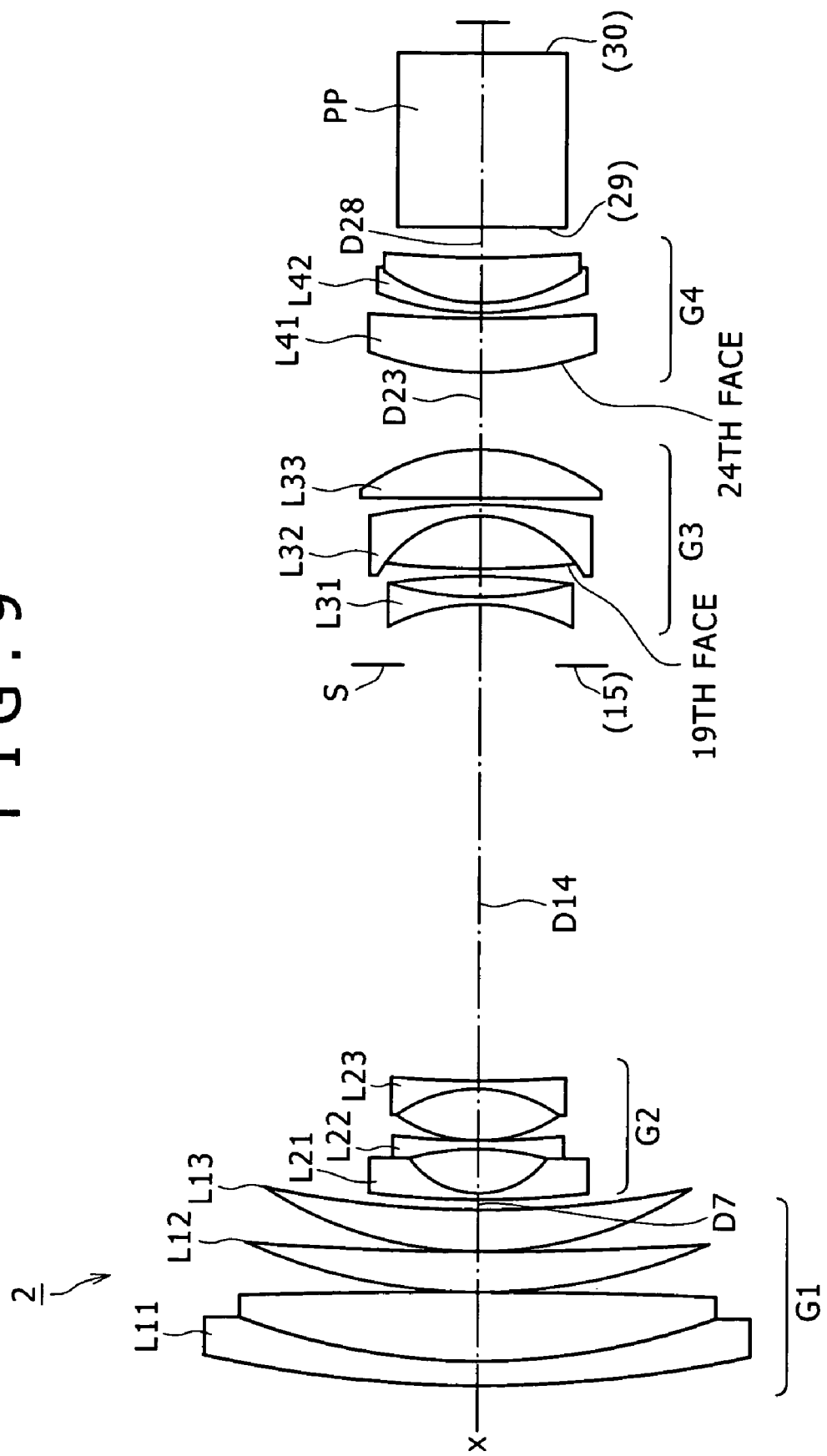
FIG. 9 is a schematic view showing a configuration of another zoom lens to which the present invention is applied.

FIG. 9 shows a lens configuration of a zoom lens according to a second embodiment of the present invention. Referring to FIG. 9, the first lens group G1 includes a cemented lens L11 of a negative lens of a meniscus shape having a convex face directed to the object side and a positive lens having a convex face directed to the object side, a positive lens L12 having a convex face directed to the object side, and a positive lens L13 having a convex faced directed to the object side. The second lens group G2 includes a negative lens L21 of a meniscus shape having a concave face directed to the image side, a negative lens L22 having a biconcave shape, and a cemented lens L23 of a biconvex lens and a biconcave lens. The third lens group G3 includes a cemented negative lens L31 of a biconcave lens and a positive lens having a convex face directed to the object side, a cemented lens L32 of a biconvex lens having an aspheric face on the object side and a negative lens having a concave face directed to the object side, and a positive lens L33 having a convex face directed to the image side. The fourth lens group G4 includes a positive lens L41 having a convex face of an aspheric shape directed to the object side, and a cemented lens L42 of a negative lens having a concave face directed the image side and a positive lens having a convex lens directed to the object side.

In the zoom lens 2 of the second embodiment, the cemented negative lens L31 disposed in the third lens group G3 forms a negative sub group and the cemented lens L32 and the positive lens L33 in the third lens group G3 form a positive sub group. Then, the positive sub group L32 and L33 is shifted in a direction substantially perpendicular to the optical axis x to shift an image in a direction substantially perpendicular to the optical axis x.

In the zoom lens 2, a color separation prism PP is disposed on the image side of the fourth lens group G4 fixedly in the direction of the optical axis. Meanwhile, an aperture stop S is disposed on the object side of the third lens group G3 and is fixed in the direction of the optical axis together with the third lens group G3 when the lens position state varies.

Numerical values of various dimensions of a numerical value example 2 wherein particular numerical values are applied to the zoom lens 2 of the second embodiment are indicated in Table 5 below:

TABLE 5

| Face No. | Radius of curvature | Face distance | Refractive index | Abbe No. | |
|---|---|---|---|---|---|
| 1: | 26.2087 | 0.490 | 1.84666 | 23.8 | |
| 2: | 14.7706 | 1.469 | 1.49700 | 81.6 | |
| 3: | −114.5260 | 0.049 | | | |
| 4: | 12.5245 | 0.876 | 1.49700 | 81.6 | |
| 5: | 54.2087 | 0.049 | | | |
| 6: | 8.8958 | 0.837 | 1.49700 | 81.6 | |
| 7: | 20.8989 | (D7) | | | |
| 8: | 18.3065 | 0.171 | 1.75500 | 52.3 | |
| 9: | 1.9052 | 0.938 | | | |
| 10: | −11.0709 | 0.147 | 1.88300 | 40.8 | |
| 11: | 8.8397 | 0.049 | | | |
| 12: | 3.2037 | 1.178 | 1.75520 | 27.5 | |
| 13: | −3.1296 | 0.147 | 1.88300 | 40.8 | |
| 14: | 10.0915 | (D14) | | | |
| 15: | 0.0000 | 1.263 | | | (Aperture stop) |
| 16: | −4.2208 | 0.147 | 1.75520 | 27.5 | |
| 17: | 7.7645 | 0.495 | 1.92286 | 18.9 | |
| 18: | −9.9555 | 0.147 | | | |
| 19: | 12.1878 | 1.202 | 1.58913 | 61.3 | |
| 20: | −2.6827 | 0.208 | 1.80100 | 35.0 | |
| 21: | −11.7616 | 0.073 | | | |
| 22: | 143.7374 | 1.155 | 1.49700 | 81.6 | |
| 23: | −4.0930 | (D23) | | | |
| 24: | 6.3850 | 1.224 | 1.69350 | 53.3 | |
| 25: | 82.9604 | 0.122 | | | |
| 26: | 6.0637 | 0.147 | 1.84666 | 23.8 | |
| 27: | 3.3544 | 1.102 | 1.48749 | 70.4 | |
| 28: | 48.9615 | (D28) | | | |
| 29: | 0.0000 | 3.807 | 1.51680 | 64.2 | |
| 30: | 0.0000 | (Bf) | | | |

In the zoom lens 2, when the lens position state varies from a wide angle end state to a telephoto end state, the distance D7 between the first lens group G1 and the second lens group G2, the distance D14 between the second lens group G2 and the aperture stop S, the distance D23 between the third lens group G3 and the fourth lens group G4 and the distance D28 between the fourth lens group G4 and the color separation prism PP vary. Therefore, values of the face distances in the numerical value example 2 in the wide angle end state, in an intermediate focal length state between the wide angle end and the telephoto end and in the telephoto end state are indicated in Table 6 below together with those of the focal length f, F number Fno. and angle of view 2ω.

TABLE 6

| f | 1.000~ | 8.860~ | 21.057 |
|---|---|---|---|
| FN0 | 1.65~ | 2.18~ | 2.88 |
| 2ω | 60.31~ | 7.14~ | 2.99° |
| D7 | 0.184 | 7.703 | 9.029 |
| D14 | 9.457 | 1.938 | 0.612 |
| D23 | 1.666 | 0.700 | 2.017 |

TABLE 6-continued

| | | | |
|---|---|---|---|
| D23 | 0.586 | 1.572 | 0.255 |
| Bf | 0.567 | 0.567 | 0.567 |

The 19th face and the 24th face in the zoom lens 2 are each formed from an aspheric face. Therefore, fourth-, sixth-, eighth- and tenth-order aspheric coefficients A, B, C and D of the aspheric faces in the numerical value example 2 are indicated in Table 7 below together with the constant κ of the cone.

TABLE 7

| | | | | | |
|---|---|---|---|---|---|
| 19th face | κ = −0.160601 | A = −0.218930E−02 | B = −0.985084E−04 | C = 0.145786E−04 | |
| | | D = −0.215771E−05 | | | |
| 24th face | κ = −0.658853 | A = −0.457647E−03 | B = −0.105701E−04 | C = 0.624990E−05 | |
| | | D = −0.587955E−06 | | | |

Corresponding values to the conditional expressions (1), (2), (3), (4) and (5) of the numerical value example 2 described hereinabove are indicated in Table 8 below:

TABLE 8 f3n = −16.899
f3 = 8.484
f2 = −2.122
(1) |f3n|/f3 = 1.992
(2) (Rn + Rp)/(Rn − Rp) = −0.101
(3) (Rp1 − Rp2)/(Rp1 − Rp2) = 0.945
(4) |f2|/(fw · ft)$^{1/2}$ = 0.462
(5) Dt/Z2 = 1.052

Figure 10:
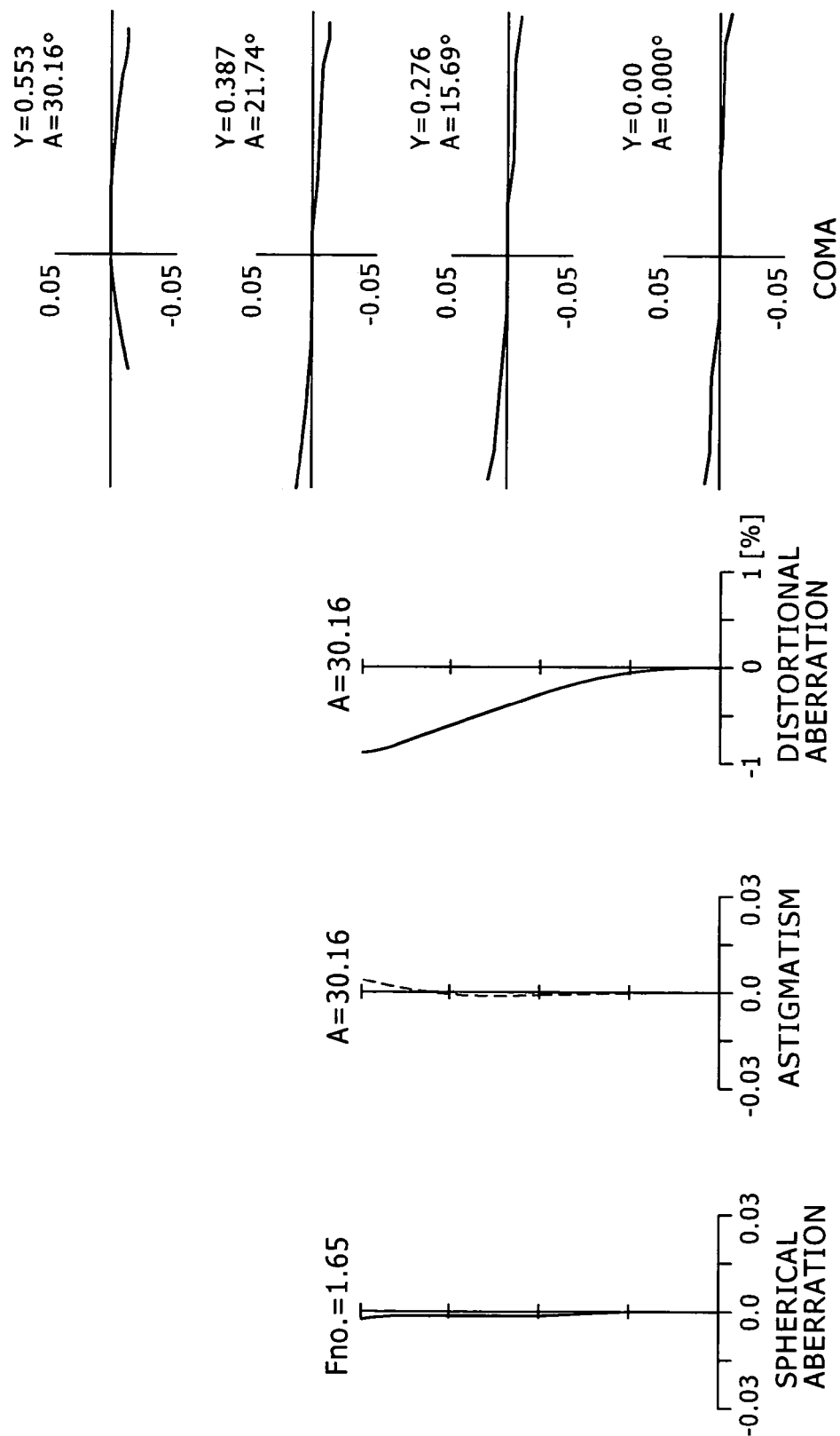
FIG. 10 is a diagrammatic view illustrating spherical aberration, astigmatism, distortional aberration and coma in a wide angle end state of the zoom lens of FIG. 9 according to a numerical value example 2 wherein particular numerical values are applied to the zoom lens.
Figure 11:
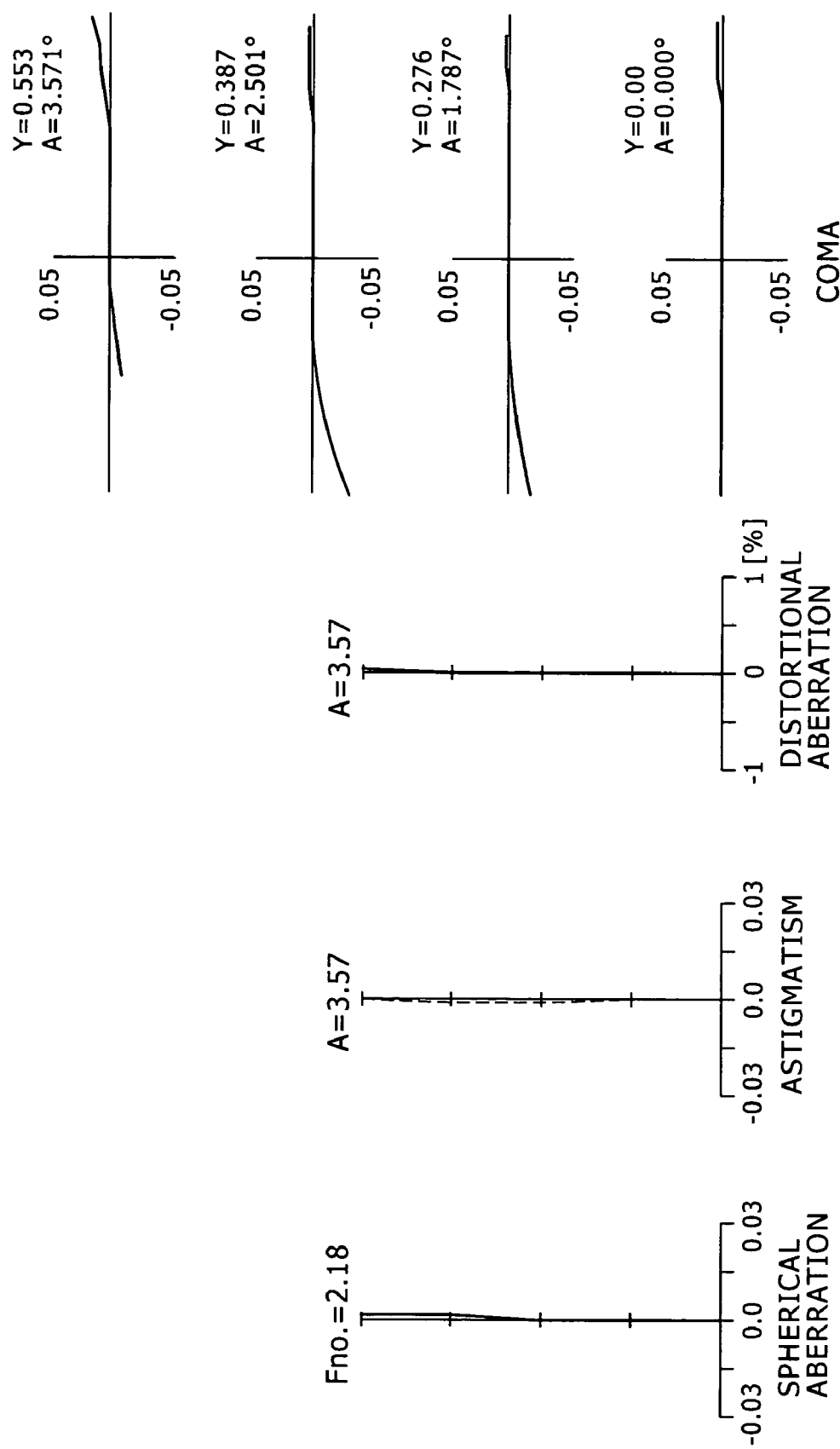
FIG. 11 is a similar view but illustrating spherical aberration, astigmatism, distortional aberration and coma in an intermediate focal length state of the zoom lens of FIG. 9 according to the numerical value example 2.
Figure 12:
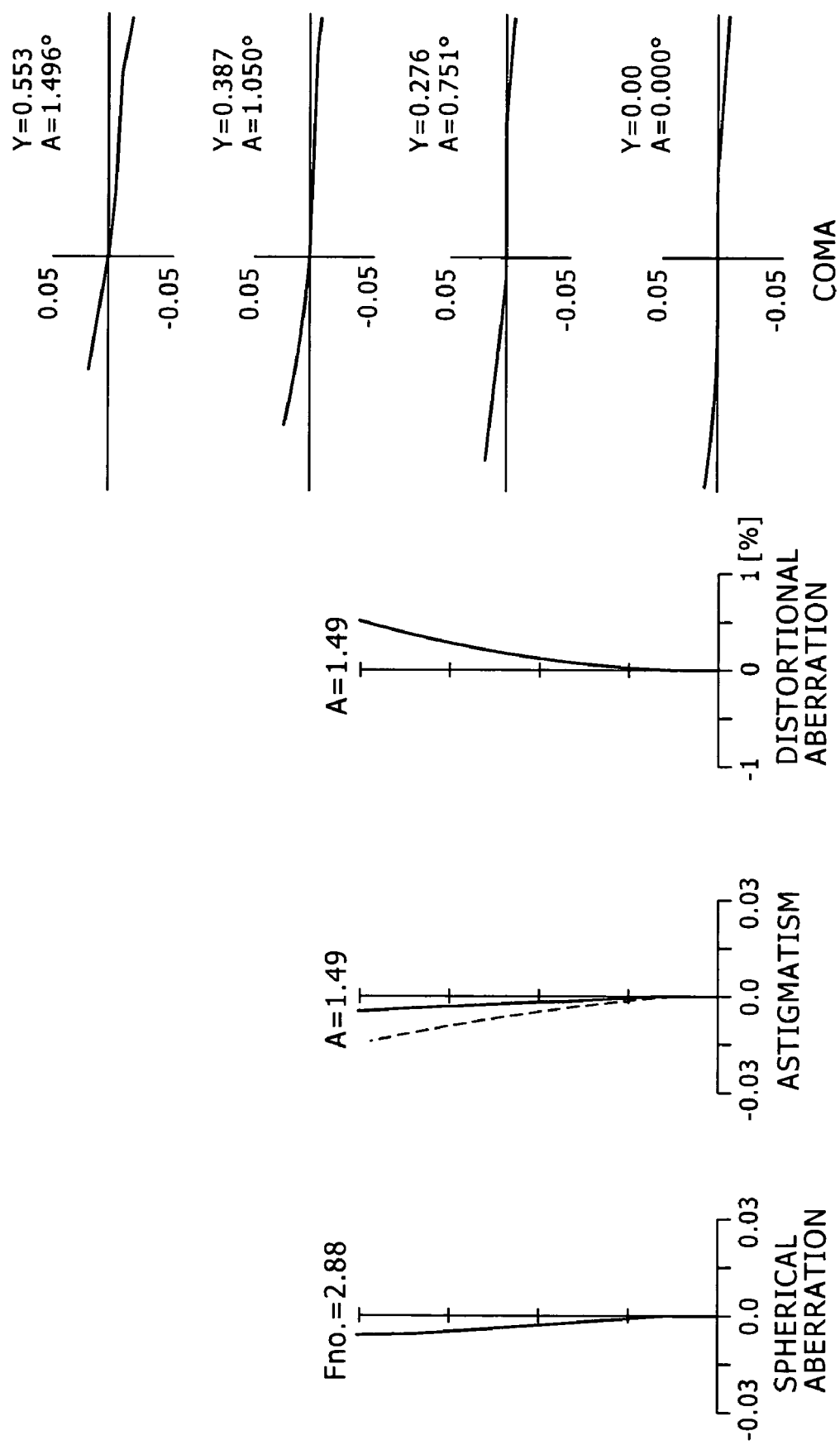
FIG. 12 is a similar view but illustrating spherical aberration, astigmatism, distortional aberration and coma in a telephoto end state of the zoom lens of FIG. 9 according to the numerical value example 2.

FIGS. 10 to 12 illustrate various aberrations in a focused state on infinity in the numerical value example 2. Particularly, FIG. 10 illustrates various aberrations in a wide angle end state (f=1.000); FIG. 11 illustrates various aberrations in an intermediate focal length state (f=8.860); and FIG. 12 illustrates various aberrations in a telephoto end state (f=21.057);

In the aberration diagrams of FIGS. 10 to 12, a solid line in a spherical aberration diagram indicates spherical aberration, and a solid line in an astigmatism diagram indicates a sagittal image plane and a broken line indicates a meridional image plane. In a coma diagram, y indicates an image height. Further, in the aberration diagrams, Fno. represents an F number, and A represents a half angle of view.

Figure 13:
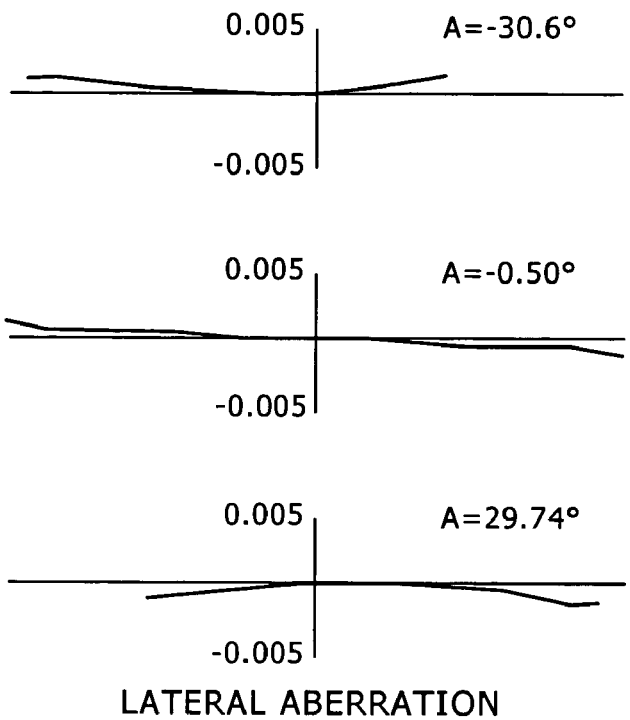
FIG. 13 is a diagrammatic view illustrating lateral aberration in a lens shift state by 0.5 degrees in a wide angle end state of the zoom lens of FIG. 9 according to the numerical value example 2.
Figure 14:
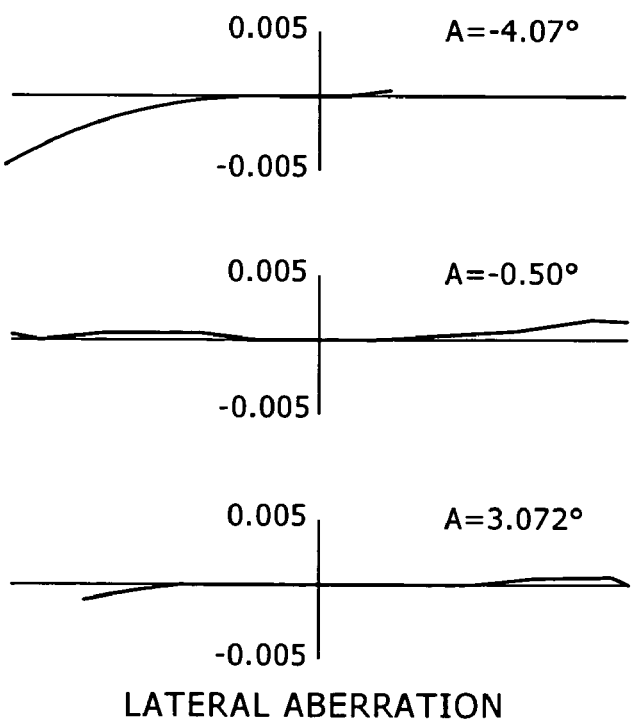
FIG. 14 is a similar view but illustrating lateral aberration in a lens shift state by 0.5 degrees in an intermediate focal length state of the zoom lens of FIG. 9 according to the numerical value example 2.
Figure 15:
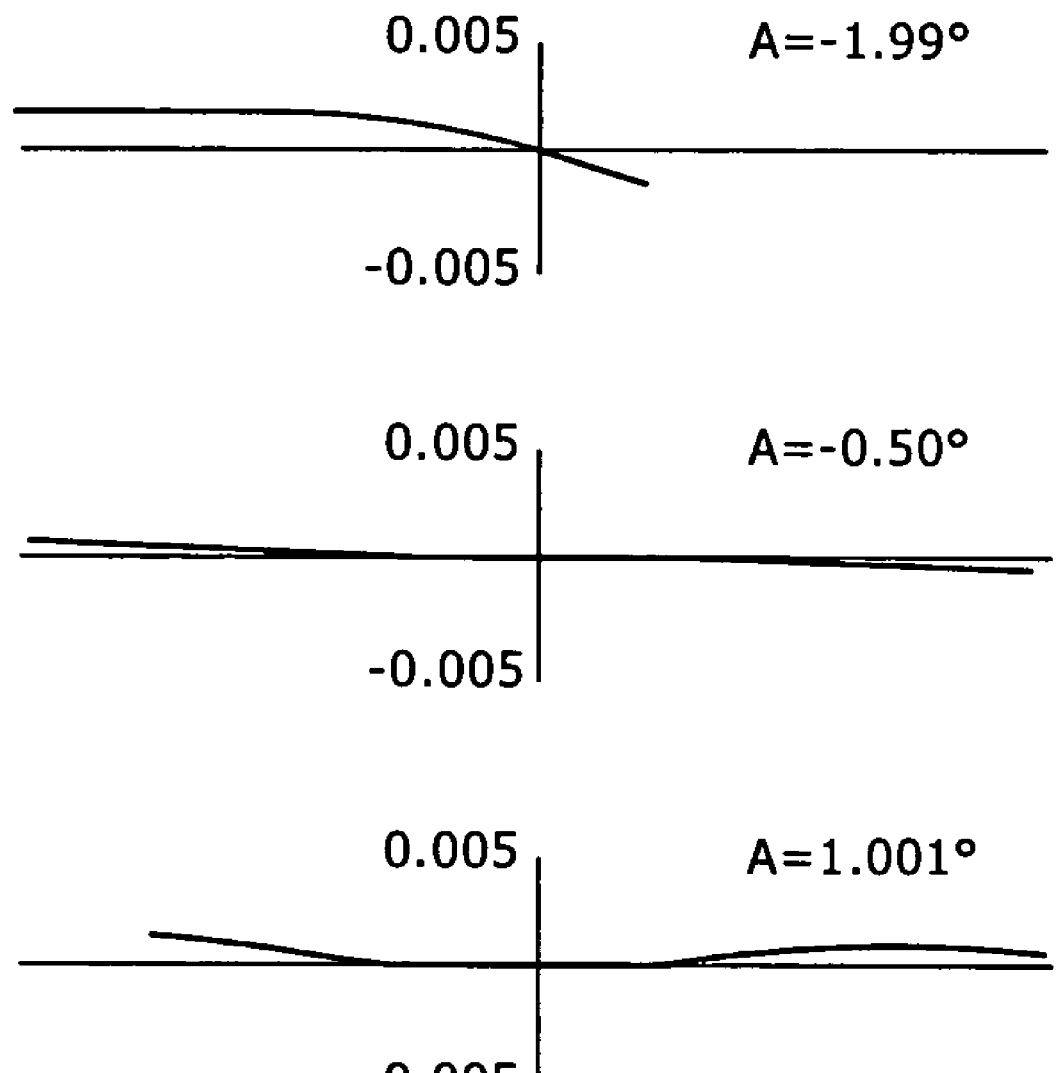
FIG. 15 is a similar view but illustrating lateral aberration in a lens shift state by 0.5 degrees in a telephoto end state of the zoom lens of FIG. 9 according to the numerical value example 2.

FIGS. 13 to 15 illustrate lateral aberration in a lens shift state corresponding to 0.5 degrees in a focused state on infinity in the numerical value example 2. Particularly, FIG. 13 illustrates lateral aberration in a wide angle end state (f=1.000) of the zoom lens; FIG. 14 illustrates lateral aberration in an intermediate focal length state (f=8.860); and FIG. 15 illustrates lateral aberration in a telephoto end state (f=21.057).

It can be seen apparently from the aberration diagrams that the numerical value example 2 indicates favorably corrected aberrations and has a superior image forming property.

Figure 16:
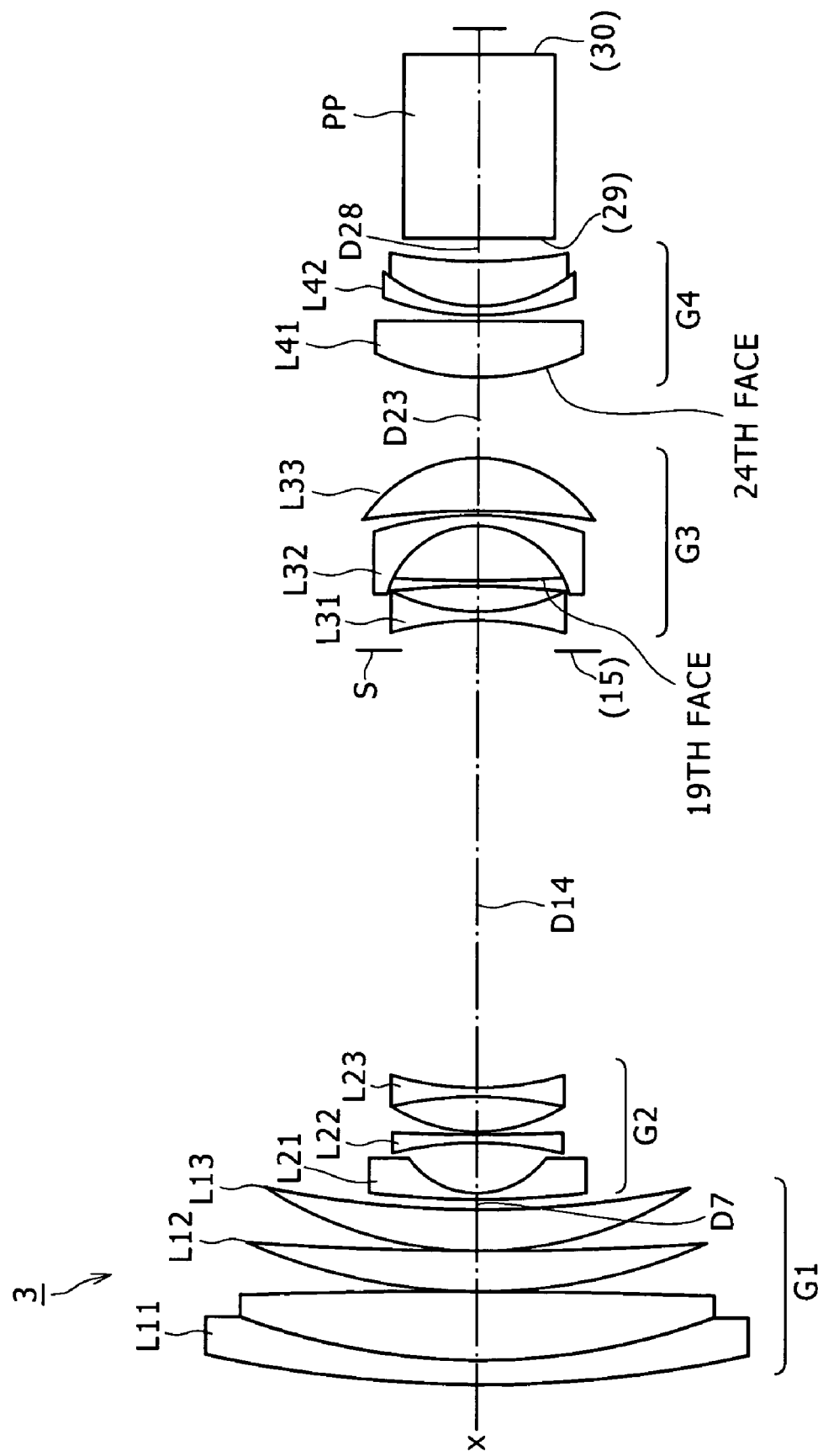
FIG. 16 is a schematic view showing a configuration of a further zoom lens to which the present invention is applied.

FIG. 16 shows a lens configuration of a zoom lens according to a third embodiment of the present invention. Referring to FIG. 16, the first lens group G1 includes a cemented lens L11 of a negative lens of a meniscus shape having a convex face directed to the object side and a positive lens having a convex face directed to the object side, a positive lens L12 having a convex face directed to the object side, and a positive lens L13 having a convex face directed to the object side. The second lens group G2 includes a negative lens L21 of a meniscus shape having a concave face directed to the image side, a negative lens L22 having a biconcave shape, and a cemented lens L23 of a biconvex lens and a biconcave lens. The third lens group G3 includes a cemented negative lens L31 of a biconcave lens and a positive lens having a convex face directed to the object side, a cemented lens L32 of a biconvex lens having an aspheric face on the object side and a negative lens having a concave face directed to the object side, and a positive lens L33 having a convex face directed to the image side. The fourth lens group G4 includes a positive lens L41 having a convex face of an aspheric shape directed to the object side, and a cemented lens L42 of a negative lens having a concave face directed the image side and a positive lens having a convex lens directed to the object side.

In the zoom lens 3 of the third embodiment, the cemented negative lens L31 disposed in the third lens group G3 forms a negative sub group and the cemented lens L32 and the positive lens L33 in the third lens group G3 form a positive sub group. Then, the positive sub group L32 and L33 is shifted in a direction substantially perpendicular to the optical axis x to shift an image in a direction substantially perpendicular to the optical axis x.

In the zoom lens 3, a color separation prism PP is disposed on the image side of the fourth lens group G4 fixedly in the direction of the optical axis. Meanwhile, an aperture stop S is disposed on the object side of the third lens group G3 and is fixed in the direction of the optical axis together with the third lens group G3 when the lens position state varies.

Numerical values of various dimensions of a numerical value example 3 wherein particular numerical values are applied to the zoom lens 3 of the third embodiment are indicated in Table 9 below:

TABLE 9

| Face No. | Radius of curvature | Face distance | Refractive index | Abbe No. | |
|---|---|---|---|---|---|
| 1: | 24.3809 | 0.502 | 1.84666 | 23.8 | |
| 2: | 13.9540 | 1.532 | 1.45600 | 90.3 | |
| 3: | −214.7871 | 0.050 | | | |
| 4: | 13.1105 | 0.831 | 1.60300 | 65.5 | |
| 5: | 46.9098 | 0.050 | | | |
| 6: | 9.4060 | 0.871 | 1.49700 | 81.6 | |
| 7: | 23.8113 | (D7) | | | |
| 8: | 15.8186 | 0.176 | 1.83481 | 43.0 | |
| 9: | 1.9593 | 1.095 | | | |
| 10: | −8.0108 | 0.151 | 1.88300 | 40.8 | |
| 11: | 25.7611 | 0.050 | | | |
| 12: | 3.4385 | 0.814 | 1.80809 | 22.8 | |
| 13: | −8.9759 | 0.151 | 1.88300 | 40.8 | |
| 14: | 6.3992 | (D14) | | | |
| 15: | 0.0000 | 0.628 | | | (Aperture stop) |
| 16: | −5.9219 | 0.151 | 1.74950 | 35.3 | |
| 17: | 4.7066 | 0.548 | 1.84666 | 23.8 | |
| 18: | −19.4034 | 0.151 | | | |
| 19: | 15.6193 | 1.228 | 1.58913 | 61.3 | |

TABLE 9-continued

| Face No. | Radius of curvature | Face distance | Refractive index | Abbe No. |
| --- | --- | --- | --- | --- |
| 20: | −2.1337 | 0.213 | 1.88300 | 40.8 |
| 21: | −7.7932 | 0.085 | | |
| 22: | −21.9672 | 1.221 | 1.49700 | 81.6 |
| 23: | −3.0471 | (D23) | | |
| 24: | 5.2667 | 1.253 | 1.58913 | 61.3 |
| 25: | 179.9768 | 0.126 | | |
| 26: | 5.4066 | 0.151 | 1.84666 | 23.8 |
| 27: | 3.0843 | 1.030 | 1.48749 | 70.4 |
| 28: | 12.1193 | (D28) | | |
| 29: | 0.0000 | 3.905 | 1.51680 | 64.2 |
| 30: | 0.0000 | (Bf) | | |

In the zoom lens 3, when the lens position state varies from a wide angle end state to a telephoto end state, the distance D7 between the first lens group G1 and the second lens group G2, the distance D14 between the second lens group G2 and the aperture stop S, the distance D23 between the third lens group G3 and the fourth lens group G4 and the distance D28 between the fourth lens group G4 and the color separation prism PP vary. Therefore, values of the face distances in the numerical value example 3 in the wide angle end state, in an intermediate focal length state between the wide angle end and the telephoto end and in the telephoto end state are indicated in Table 10 below together with those of the focal length f, F number Fno. and angle of view 2ω.

TABLE 10

| f | 1.000~ | 9.196~ | 21.061 |
| --- | --- | --- | --- |
| FN0 | 1.65~ | 2.18~ | 2.88 |
| 2ω | 60.31~ | 7.14~ | 2.99° |
| D7 | 0.188 | 7.970 | 9.308 |
| D14 | 9.932 | 2.150 | 0.812 |
| D23 | 1.779 | 0.733 | 2.054 |
| D28 | 0.535 | 1.581 | 0.260 |
| Bf | 0.583 | 0.583 | 0.583 |

The 19th face and the 24th face in the zoom lens 3 are each formed from an aspheric face. Therefore, fourth-, sixth-, eighth- and tenth-order aspheric coefficients A, B, C and D of the aspheric faces in the numerical value example 3 are indicated in Table 11 below together with the constant κ of the cone.

TABLE 11

| 19$^{th}$ face | κ = −0.535226 | A = −0.367375E−02 | B = −0.340086E−03 | C = 0.100074E−04 |
| | | D = −0.234761E−04 | | |
| 24$^{th}$ face | κ = −0.317306 | A = −0.539214E−03 | B = −0.300931E−04 | C = 0.532791E−05 |
| | | D = 0.118175E−06 | | |

Corresponding values to the conditional expressions (1), (2), (3), (4) and (5) of the numerical value example 3 described hereinabove are indicated in Table 12 below:

TABLE 12 f3n = −16.607
f3 = 8.486
f2 = −2.163
(1) |f3n|/f3 = 1.957
(2) (Rn + Rp)/(Rn − Rp) = 0.108
(3) (Rp1 + Rp2)/(Rp1 − Rp2) = 1.322

TABLE 12-continued (4) |f2|/(fw · ft)$^{1/2}$ = 0.471
(5) Dt/Z2 = 0.969

Figure 17:
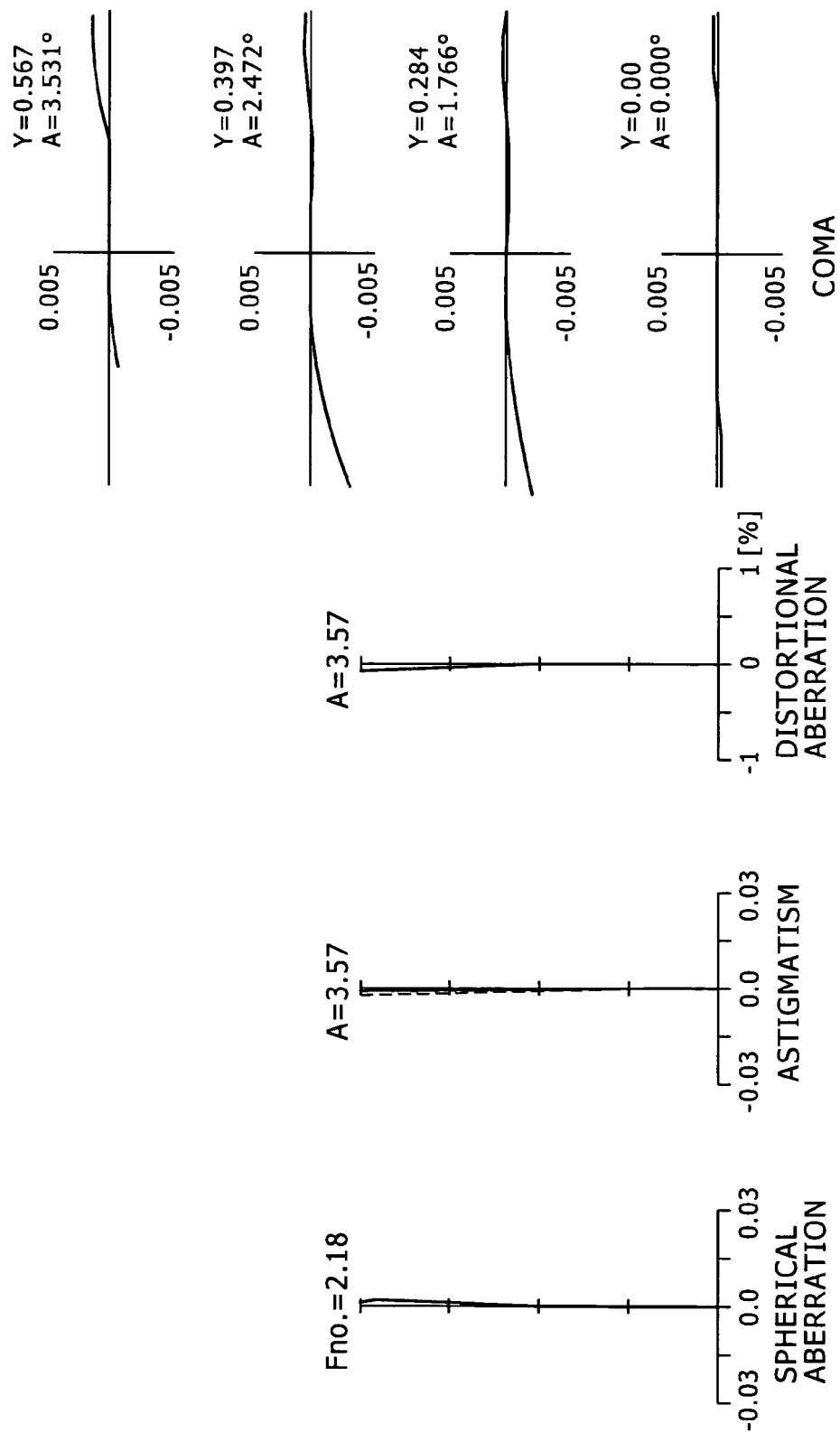
FIG. 17 is a diagrammatic view illustrating spherical aberration, astigmatism, distortional aberration and coma in a wide angle end state of the zoom lens of FIG. 16 according to a numerical value example 3 wherein particular numerical values are applied to the zoom lens.
Figure 18:
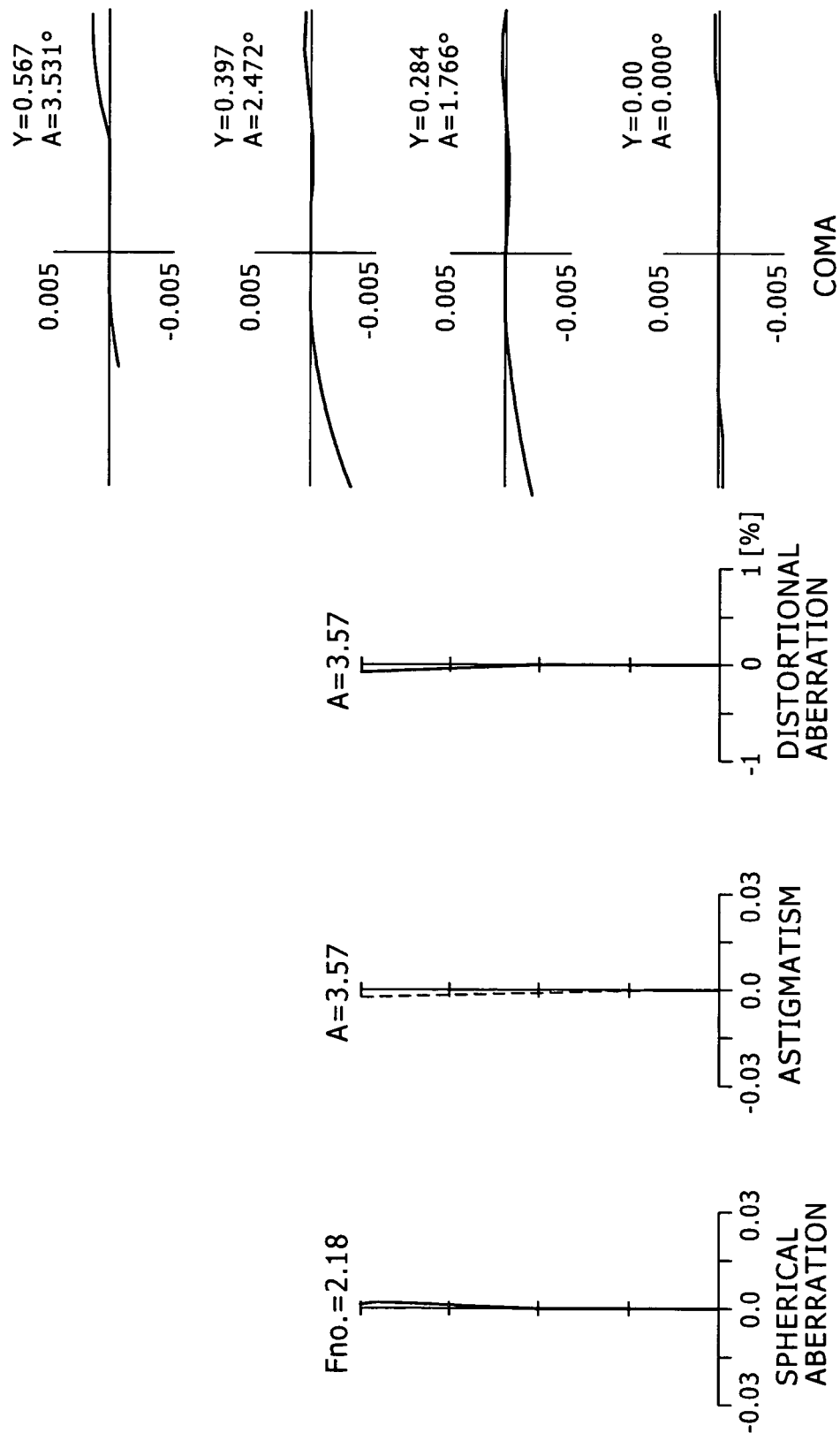
FIG. 18 is a similar view but illustrating spherical aberration, astigmatism, distortional aberration and coma in an intermediate focal length state of the zoom lens of FIG. 16 according to the numerical value example 3.
Figure 19:
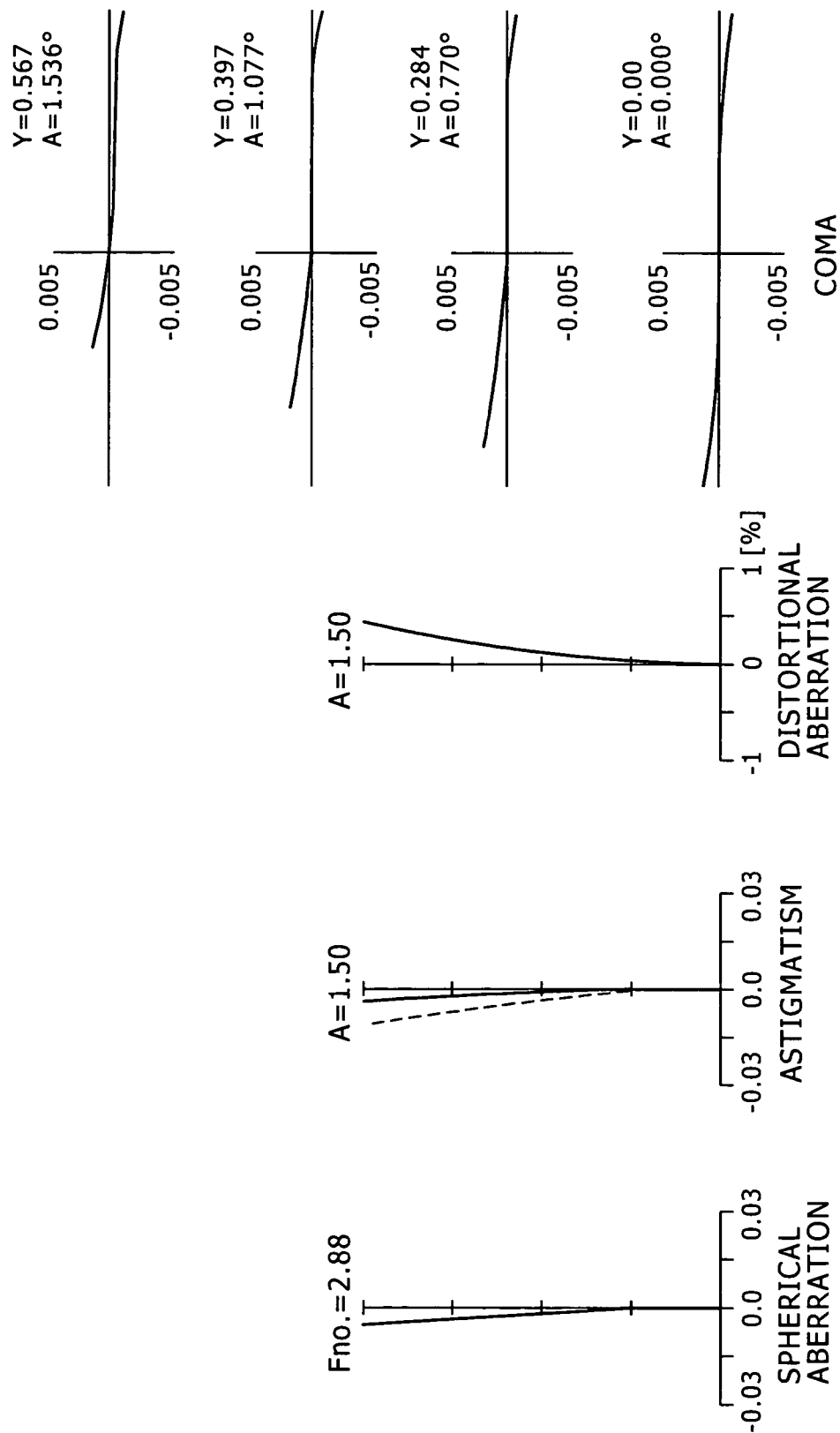
FIG. 19 is a similar view but illustrating spherical aberration, astigmatism, distortional aberration and coma in a telephoto end state of the zoom lens of FIG. 16 according to the numerical value example 3.

FIGS. 17 to 19 illustrate various aberrations in a focused state on infinity in the numerical value example 3. Particularly, FIG. 17 illustrates various aberrations in a wide angle end state (f=1.000); FIG. 18 illustrates various aberrations in an intermediate focal length state (f=9.196); and FIG. 19 illustrates various aberrations in a telephoto end state (f=21.061).

In the aberration diagrams of FIGS. 17 to 19, a solid line in a spherical aberration diagram indicates spherical aberration, and a solid line in an astigmatism diagram indicates a sagittal image plane and a broken line indicates a meridional image plane. In a coma diagram, y indicates an image height. Further, in the aberration diagrams, Fno. represents an F number, and A represents a half angle of view.

Figure 20:
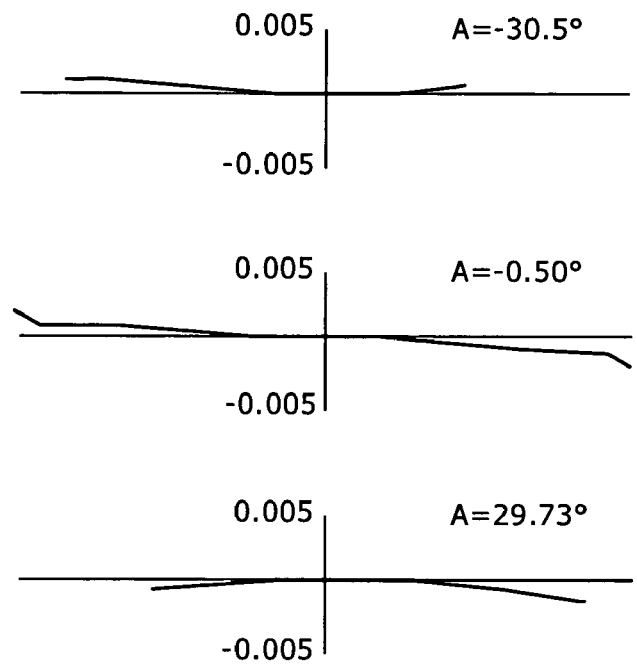
FIG. 20 is a diagrammatic view illustrating lateral aberration in a lens shift state by 0.5 degrees in a wide angle end state of the zoom lens of FIG. 16 according to the numerical value example 3.
Figure 21:
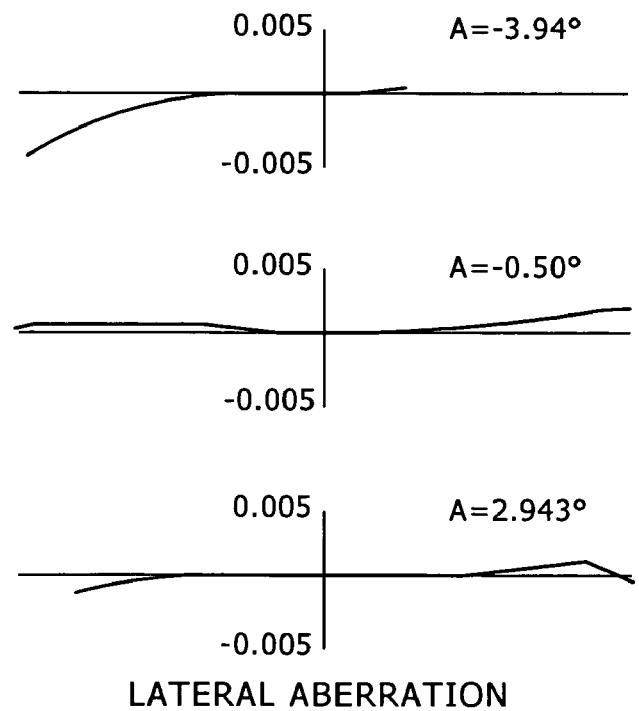
FIG. 21 is a similar view but illustrating lateral aberration in a lens shift state by 0.5 degrees in an intermediate focal length state of the zoom lens of FIG. 16 according to the numerical value example 3.

FIGS. 20 to 22 illustrate lateral aberration in a lens shift state corresponding to 0.5 degrees in a focused state on infinity in the numerical value example 3. Particularly, FIG. 20 illustrates lateral aberration in a wide angle end state (f=1.000) of the zoom lens; FIG. 21 illustrates lateral aberration in an intermediate focal length state (f=9.196); and FIG. 22 illustrates lateral aberration in a telephoto end state (f=21.061).

It can be seen apparently from the aberration diagrams that the numerical value example 3 indicates favorably corrected aberrations and has a superior image forming property.

Figure 23:
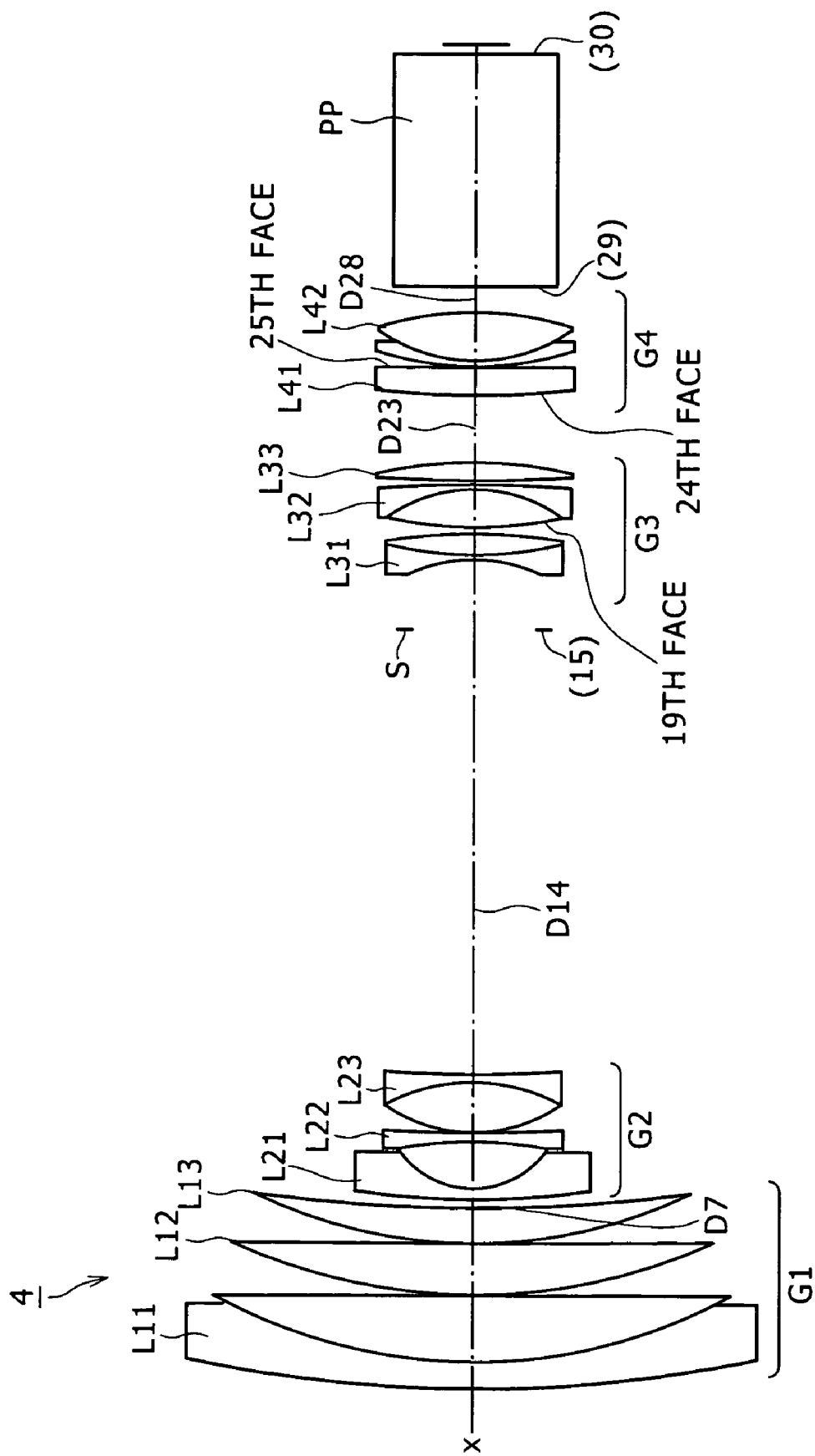
FIG. 23 is a schematic view showing a configuration of a still further zoom lens to which the present invention is applied.

FIG. 23 shows a lens configuration of a zoom lens according to a fourth embodiment of the present invention. Referring to FIG. 23, the first lens group G1 includes a cemented lens L11 of a negative lens of a meniscus shape having a convex face directed to the object side and a positive lens having a convex face directed to the object side, a positive lens L12 having a convex face directed to the object side, and a positive lens L13 having a convex face directed to the object side. The second lens group G2 includes a negative lens L21 of a meniscus shape having a concave face directed to the image side, a negative lens L22 having a biconcave shape, and a cemented lens L23 of a biconvex lens and a biconcave lens. The third lens group G3 includes a cemented negative lens L31 of a biconcave lens and a positive lens having a convex face directed to the object side, a cemented lens L32 of a biconvex lens having an aspheric face on the object side and a negative lens having a concave face directed to the object side, and a positive lens L33 having a convex face directed to the image side. The fourth lens group G4 includes a positive lens L41 having a convex face directed to the object side and having aspheric faces on the opposite sides thereof, and a cemented lens L42 of a negative lens having a concave face directed the image side and a positive lens having a convex lens directed to the object side.

In the zoom lens 4 of the fourth embodiment, the cemented negative lens L31 disposed in the third lens group G3 forms a negative sub group and the cemented lens L32 and the positive lens L33 in the third lens group G3 form a positive sub group. Then, the positive sub group L32 and L33 is shifted in a direction substantially perpendicular to the optical axis x to shift an image in a direction substantially perpendicular to the optical axis x.

In the zoom lens 4, a color separation prism PP is disposed on the image side of the fourth lens group G4 fixedly in the direction of the optical axis. Meanwhile, an aperture stop S is disposed on the object side of the third lens group G3 and is fixed in the direction of the optical axis together with the third lens group G3 when the lens position state varies.

Numerical values of various dimensions of a numerical value example 4 wherein particular numerical values are applied to the zoom lens 4 of the fourth embodiment are indicated in Table 13 below:

TABLE 13

| Face No. | Radius of curvature | Face distance | Refractive index | Abbe No. |
|---|---|---|---|---|
| 1: | 30.8115 | 0.509 | 1.90366 | 31.3 |
| 2: | 11.8727 | 1.514 | 1.49700 | 81.6 |
| 3: | 2800.0867 | 0.051 | | |
| 4: | 12.6295 | 1.117 | 1.60300 | 65.5 |
| 5: | 89.6376 | 0.051 | | |
| 6: | 10.9257 | 0.857 | 1.60300 | 65.5 |
| 7: | 29.1283 | (D7) | | |
| 8: | 14.5955 | 0.178 | 1.72916 | 54.7 |
| 9: | 1.9942 | 1.124 | | |
| 10: | −7.4690 | 0.153 | 1.80400 | 46.6 |
| 11: | 16.3870 | 0.051 | | |
| 12: | 3.5615 | 1.109 | 1.75520 | 27.5 |
| 13: | −4.1784 | 0.148 | 1.88300 | 40.8 |
| 14: | 8.7522 | (D14) | | |
| 15: | 0.0000 | 1.524 | | (Aperture stop) |
| 16: | −4.4361 | 0.140 | 1.74000 | 28.3 |
| 17: | 6.6718 | 0.529 | 1.92286 | 18.9 |
| 18: | −12.6653 | 0.153 | | |
| 19: | 10.2985 | 0.850 | 1.74320 | 49.3 |
| 20: | −3.6128 | 0.153 | 1.76182 | 26.5 |
| 21: | −18.4347 | 0.076 | | |
| 22: | 27.8219 | 0.371 | 1.48749 | 70.4 |

TABLE 13-continued

| Face No. | Radius of curvature | Face distance | Refractive index | Abbe No. |
|---|---|---|---|---|
| 23: | −13.3833 | (D23) | | |
| 24: | 9.5442 | 0.560 | 1.58913 | 61.3 |
| 25: | 29.6638 | 0.051 | | |
| 26: | 6.3345 | 0.140 | 1.84666 | 23.8 |
| 27: | 3.5284 | 1.099 | 1.48749 | 70.4 |
| 28: | −6.0382 | (D28) | | |
| 29: | 0.0000 | 5.210 | 1.51680 | 64.2 |
| 30: | 0.0000 | (Bf) | | |

In the zoom lens 4, when the lens position state varies from a wide angle end state to a telephoto end state, the distance D7 between the first lens group G1 and the second lens group G2, the distance D14 between the second lens group G2 and the aperture stop S, the distance D23 between the third lens group G3 and the fourth lens group G4 and the distance D28 between the fourth lens group G4 and the color separation prism PP vary. Therefore, values of the face distances in the numerical value example 4 in the wide angle end state, in an intermediate focal length state between the wide angle end and the telephoto end and in the telephoto end state are indicated in Table 14 below together with those of the focal length f, F number Fno. and angle of view 2ω.

TABLE 14

| f | 1.000~ | 8.896~ | 19.496 |
|---|---|---|---|
| FN0 | 1.65~ | 2.22~ | 2.88 |
| 2ω | 62.25~ | 7.39~ | 3.35° |
| D7 | 0.191 | 8.360 | 9.721 |
| D14 | 10.367 | 2.198 | 0.837 |
| D23 | 1.613 | 0.671 | 1.686 |
| D28 | 0.538 | 1.480 | 0.465 |
| Bf | 0.272 | 0.272 | 0.272 |

The 19th face, the 24th face and the 25th face in the zoom lens 4 are each formed from an aspheric face. Therefore, fourth-, sixth-, eighth- and tenth-order aspheric coefficients A, B, C and D of the aspheric faces in the numerical value example 4 are indicated in Table 15 below together with the constant κ of the cone.

TABLE 15

| 19$^{th}$ face | κ = 1.398608 | A = −0.125336E−02  B = 0.689607E−05  C = −0.195733E−05 |
| | | D = 0.353872E−06 |
| 24$^{th}$ face | κ = 0.394895 | A = −0.202743E−02  B = −0.853814E−03  C = 0.990868E−05 |
| | | D = −0.398892E−05 |
| 25$^{th}$ face | κ = 0.000000 | A = 0.607308E−03  B = −0.920198E−03  C = 0.000000E+00 |
| | | D = 0.000000E+00 |

Corresponding values to the conditional expressions (1), (2), (3), (4) and (5) of the numerical value example 4 described hereinabove are indicated in Table 16 below:

TABLE 16 f3n = −16.024
f3 = 9.237
f2 = −2.304
(1) |f3n|/f3 = 1.735
(2) (Rn + Rp)/(Rn − Rp) = 0.103

TABLE 16-continued (3) (Rp1 + Rp2)/(Rp1 − Rp2) = 0.350
(4) |f2|/(fw · ft)$^{1/2}$ = 0.471
(5) Dt/Z2 = 0.522

Figure 24:
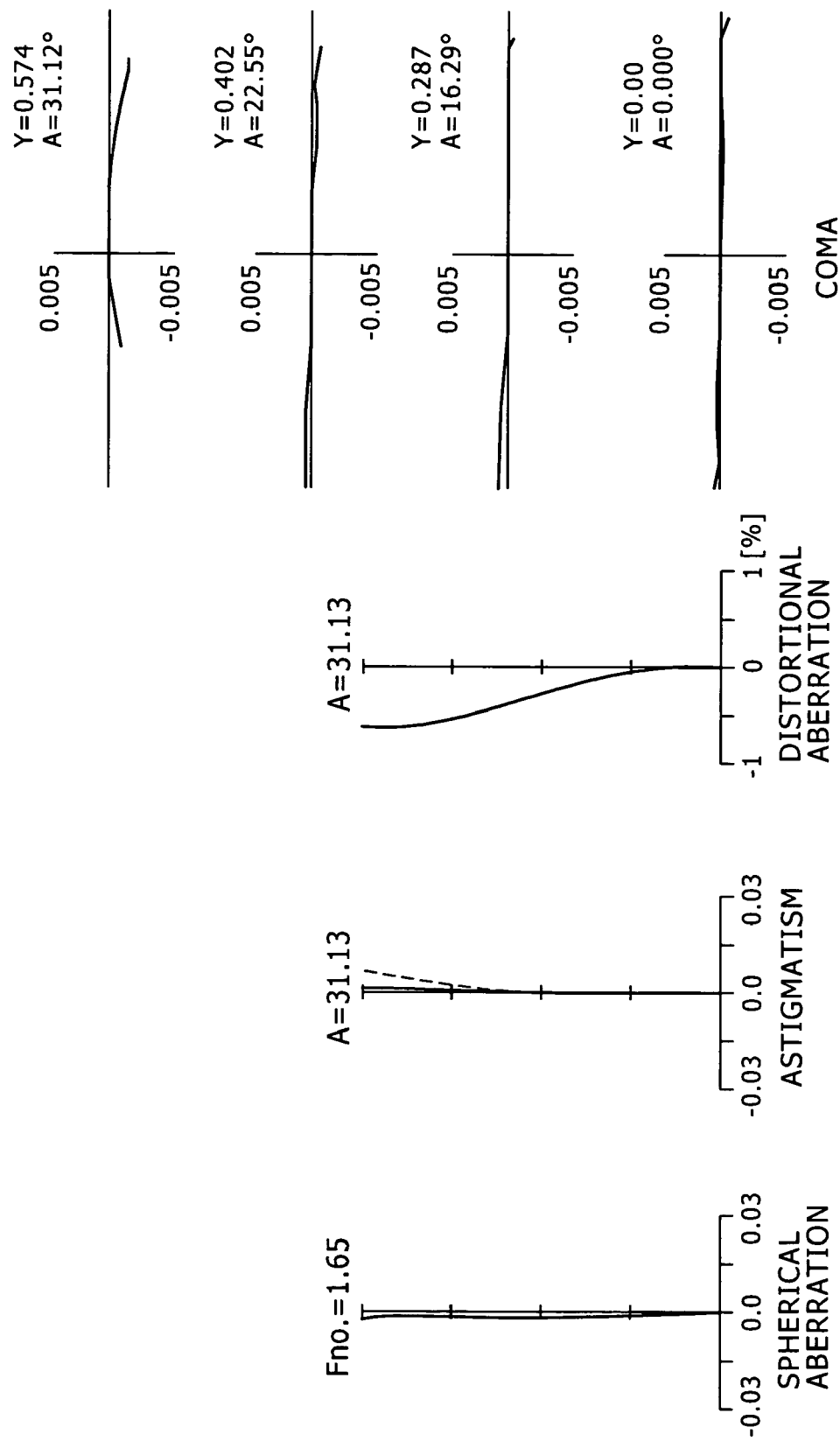
FIG. 24 is a diagrammatic view illustrating spherical aberration, astigmatism, distortional aberration and coma in a wide angle end state of the zoom lens of FIG. 23 according to a numerical value example 4 wherein particular numerical values are applied to the zoom lens.
Figure 25:
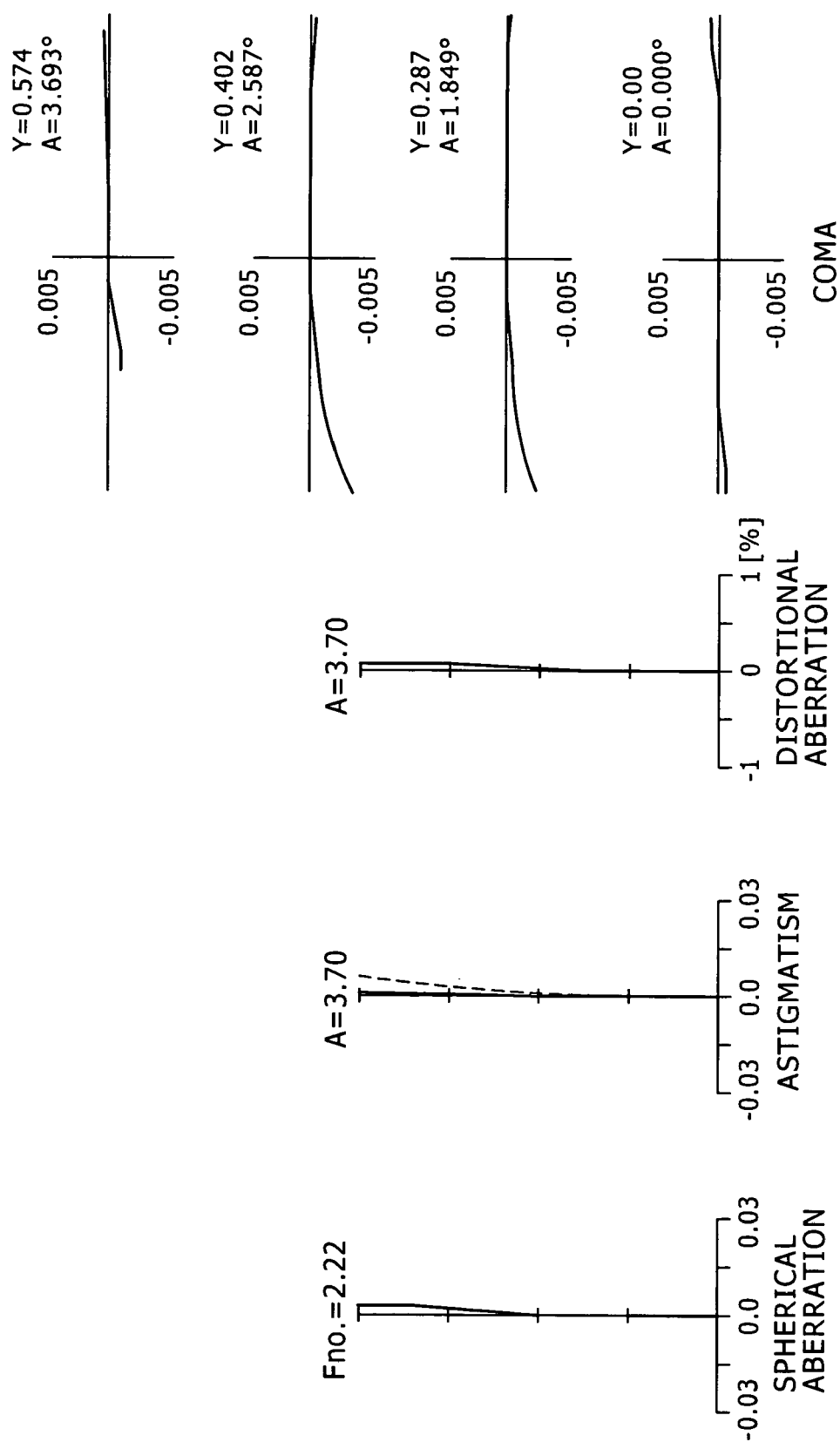
FIG. 25 is a similar view but illustrating spherical aberration, astigmatism, distortional aberration and coma in an intermediate focal length state of the zoom lens of FIG. 23 according to the numerical value example 4.
Figure 26:
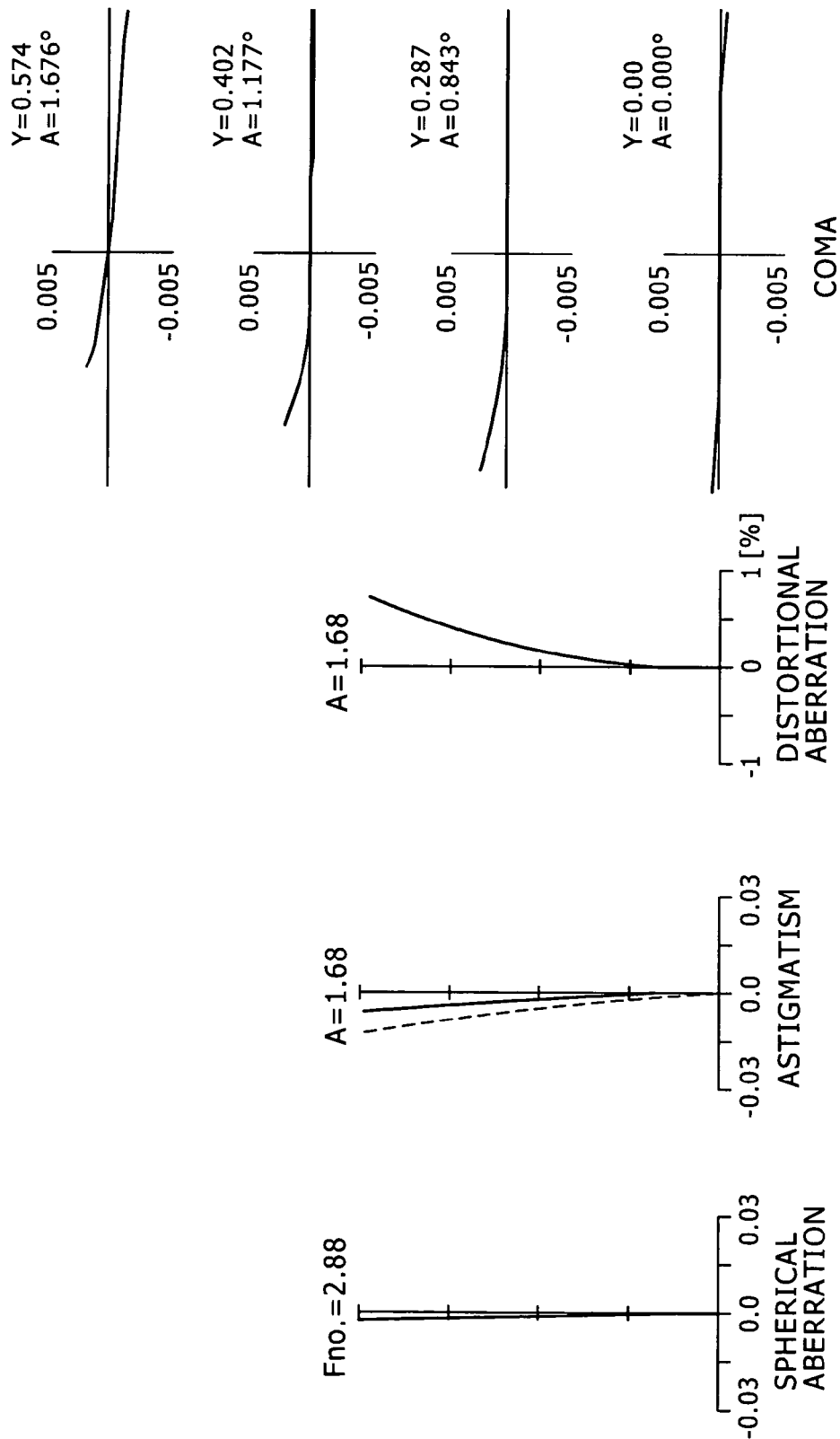
FIG. 26 is a similar view but illustrating spherical aberration, astigmatism, distortional aberration and coma in a telephoto end state of the zoom lens of FIG. 23 according to the numerical value example 4.

FIGS. 24 to 26 illustrate various aberrations in a focused state on infinity in the numerical value example 4. Particularly, FIG. 24 illustrates various aberrations in a wide angle end state (f=1.000); FIG. 25 illustrates various aberrations in an intermediate focal length state (f=8.896); and FIG. 26 illustrates various aberrations in a telephoto end state (f=19.496).

In the aberration diagrams of FIGS. 24 to 26, a solid line in a spherical aberration diagram indicates spherical aberration, and a solid line in an astigmatism diagram indicates a sagittal image plane and a broken line indicates a meridional image plane. In a coma diagram, y indicates an image height. Further, in the aberration diagrams, Fno. represents an F number, and A represents a half angle of view.

Figure 27:
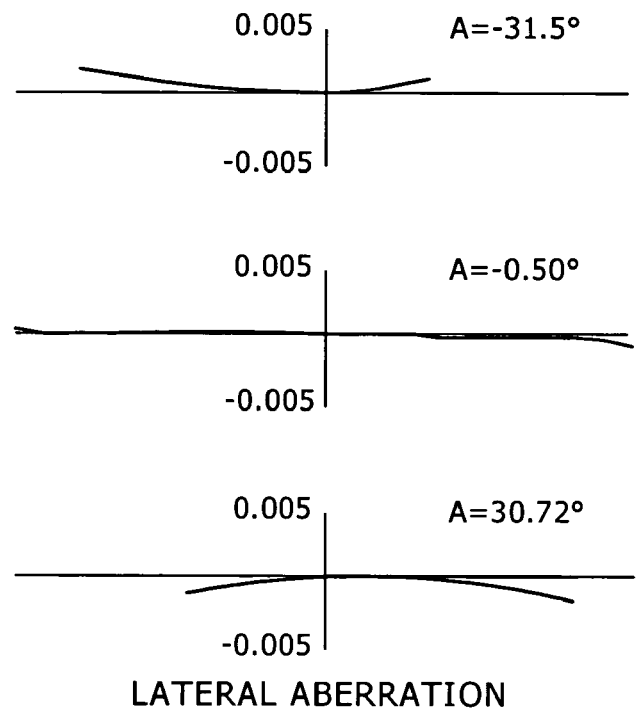
FIG. 27 is a diagrammatic view illustrating lateral aberration in a lens shift state by 0.5 degrees in a wide angle end state of the zoom lens of FIG. 23 according to the numerical value example 4.
Figure 28:
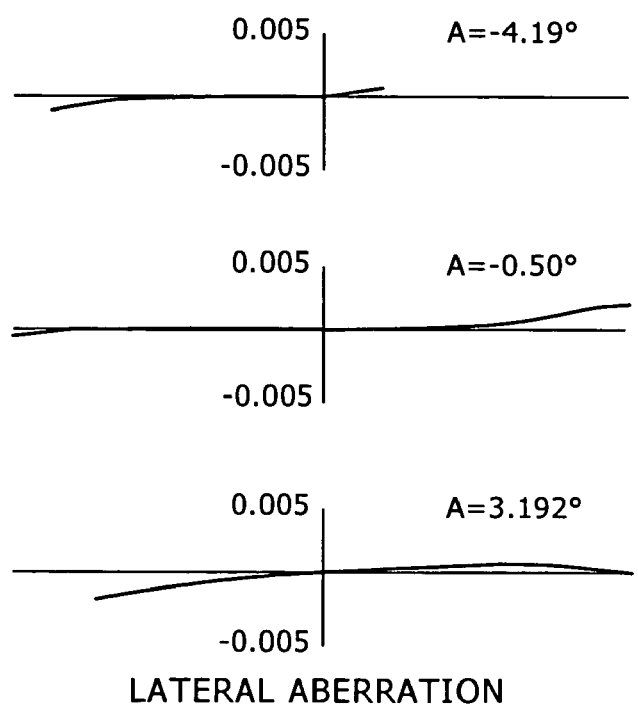
FIG. 28 is a similar view but illustrating lateral aberration in a lens shift state by 0.5 degrees in an intermediate focal length state of the zoom lens of FIG. 23 according to the numerical value example 4.
Figure 29:
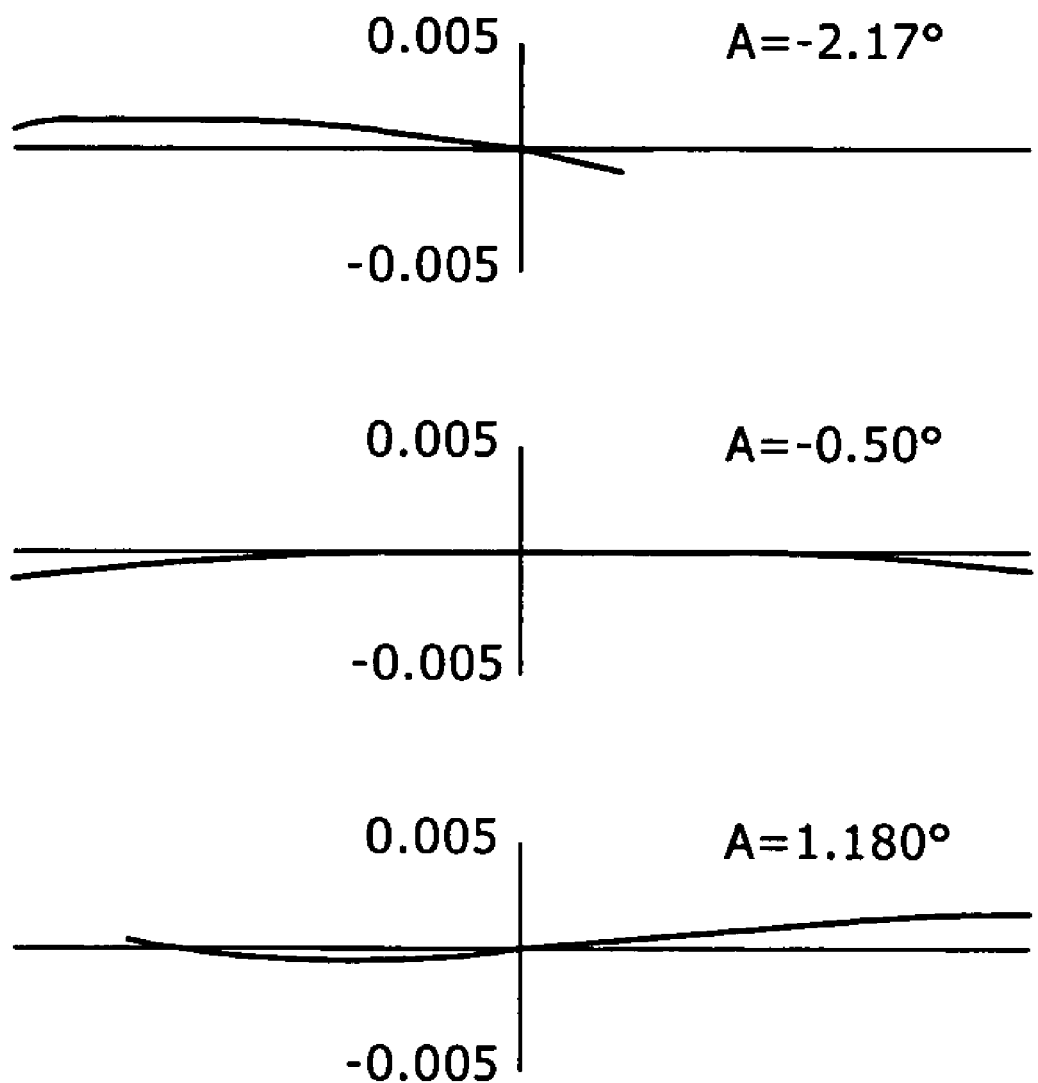
FIG. 29 is a similar view but illustrating lateral aberration in a lens shift state by 0.5 degrees in a telephoto end state of the zoom lens of FIG. 23 according to the numerical value example 4.

FIGS. 27 to 29 illustrate lateral aberration in a lens shift state corresponding to 0.5 degrees in a focused state on infinity in the numerical value example 4. Particularly, FIG. 27 illustrates lateral aberration in a wide angle end state (f=1.000) of the zoom lens; FIG. 28 illustrates lateral aberration in an intermediate focal length state. (f=8.896); and FIG. 29 illustrates lateral aberration in a telephoto end state (f=19.496).

It can be seen apparently from the aberration diagrams that the numerical value example 4 indicates favorably corrected aberrations and has a superior image forming property.

FIG. 30 shows an image pickup apparatus to which the present invention is applied.

Referring to FIG. 30, the image pickup apparatus shown is denoted by 10 and includes a zoom lens 20 and an image pickup device 30 for converting an optical signal formed by the zoom lens 20 into an electric signal. It is to be noted that the image pickup device 30 may be formed from photoelectric conversion elements such as CCDs (Charge Coupled Devices) or CMOS (Complementary Metal-Oxide Semiconductor) devices. Meanwhile, the zoom lens 20 may be formed from the zoom lens according to the present invention. In FIG. 30, each of the lens groups of the zoom lens 1 according to the first embodiment described hereinabove is shown in a simplified form of a single lens. Naturally, not only the zoom lens 1 according to the first embodiment but also any of the zoom lenses 2 to 4 according to the second to fourth embodiments and zoom lenses according to the present invention which are configured in different forms than the embodiments disclosed in the present application can be used for the zoom lens 20.

An electric signal formed by the image pickup device 30 is supplied to an image separation circuit 40. Thus, a signal for focusing control is sent from the image separation circuit 40, and an image signal is sent from the image separation circuit 40 to an image processing circuit. The signal sent to the image processing circuit is worked into a signal of a form suitable for later processing so that it is thereafter subject to various processes such as display by a display apparatus, recording on a recording medium, transfer by a communication section and so forth.

A control circuit 50 receives various operation signals from the outside such as an operation signal representative of an operation of a zoom button and performs various processes in response to the received operation signals. For example, if a zooming instruction from the zoom button is inputted to the control circuit 50, then the control circuit 50 controls driver circuits 60 and 70 to operate driving sections 61 and 71 to move the second and fourth lens groups and to perspective predetermined positions. Position information of the second and fourth lens groups and then obtained from sensors 62 and 72 is inputted to the control circuit 50 and referred to by the control circuit 50 when the control circuit 50 is to output instruction signals to the driver circuits 60 and 70. Further, the control circuit 50 checks the focusing state based on a signal received from the image separation circuit 40 and controls the driver circuit 70 to operate the driving section 71 to control the position of the fourth lens group G4 so that an optimum focused state may be obtained.

The image pickup apparatus 10 has a hand shake correction function. For example, if a shake of the image pickup device 30 caused, for example, by depression of the shutter release button is detected by a detection section 80 which may be, for example, a gyro sensor, then a signal from the detection section 80 is inputted to the control circuit 50. Consequently, the control circuit 50 calculates a blur correction angle for compensating for the blur of the image by the shake of the image pickup device 30. In order to position the positive sub group L32 and L33 of the third lens group G3 so as to be based on the calculated blur correction angle, the control circuit 50 controls a driver circuit 90 to operate a driving section 91 to move the positive sub group L32 and L33 in a direction perpendicular to the optical axis. The positions of the positive sub group L32 and L33 are detected by a sensor 92, and position information of the positive sub group L32 and L33 obtained by the sensor 92 is inputted to the control circuit 50 and referred to by the control circuit 50 when the control circuit 50 tries to signal an instruction signal to the driver circuit 90.

The image pickup apparatus 10 described above can assume various forms as a particular product. For example, the image pickup apparatus 10 can be applied widely as digital still cameras, digital video cameras and camera sections and so forth of digital inputting/outputting apparatus such as portable telephone sets in which a camera is incorporated or PDAs (Personal Digital Assistants) in which a camera is incorporated.

While preferred embodiments of the present invention have been described using specific terms, such description is for illustrative purposes only, and it is to be understood that changes and variations may be made without departing from the spirit or scope of the following claims.

What is claimed is:

1. A zoom lens, comprising:
   four lens groups including a first lens group having a positive refracting power, a second lens group having a negative refracting power, a third lens group having a positive refracting power and a fourth lens group having a positive refracting power, said first, second, third and fourth lens groups being disposed in order from an object side, said second lens group moving, when a lens position state varies from a wide angle end state to a telephoto end state, to an image side while said fourth lens group moves so as to compensate for a variation of an image plane position caused by the movement of said second lens group whereas said first and third lens groups are fixed in the direction of an optical axis; and
   an aperture stop disposed on the object side of said third lens group;
   said third lens group including a negative sub group having a negative refracting power and a positive sub group having a positive refracting power and disposed on the image side of said negative sub group with an air distance left therebetween;

said positive sub group being shiftable in a direction substantially perpendicular to the optical axis to shift an image in a direction substantially perpendicular to the optical axis;

a conditional expression (1)

$$1.4 < |f3n|/f3 < 3 \tag{1}$$

being satisfied where f3$n$ is the focal distance of said negative sub group disposed in said third lens group and f3 is the focal distance of said third lens group.

2. The zoom lens according to claim 1, wherein a conditional expression (2)

$$-0.3 < (Rn+Rp)/(Rn-Rp) < 0.3 \tag{2}$$

is satisfied where Rn is the radius of curvature of that lens face of said negative sub group disposed in said third lens group which is positioned nearest to the image side and Rp is the radius of curvature of that lens face of said positive sub group disposed in said third lens group which is positioned nearest to the object side.

3. The zoom lens according to claim 1, wherein said negative sub group includes two lenses including a positive lens and a negative lens while said positive sub group includes three lenses including a positive lens, a negative lens and another positive lens, and a conditional expression (3)

$$0 < (Rp1+Rp2)/(Rp1-Rp2) < 2 \tag{3}$$

is satisfied where Rp1 is the radius of curvature of an object side lens face of that one of the positive lens groups of said positive sub group which is positioned nearest to the image side and Rp2 is the radius of curvature of an image side lens face of that one of the positive lenses of said positive sub group which is positioned nearest to the image side.

4. The zoom lens according to claim 2, wherein said negative sub group includes two lenses including a positive lens and a negative lens while said positive sub group includes three lenses including a positive lens, a negative lens and another positive lens, and a conditional expression (3)

$$0 < (Rp1+Rp2)/(Rp1-Rp2) < 2 \tag{3}$$

is satisfied where Rp1 is the radius of curvature of an object side lens face of that one of the positive lens groups of said positive sub group which is positioned nearest to the image side and Rp2 is the radius of curvature of an image side lens face of that one of the positive lenses of said positive sub group which is positioned nearest to the image side.

5. The zoom lens according to claim 1, wherein a conditional expression (4)

$$0.42 < |f2|/(fw \cdot ft)^{1/2} < 0.5 \tag{4}$$

is satisfied where f2 is the focal distance of said second lens group, fw is the focal distance of the entire lens system in the wide angle end state, and ft is the focal distance of the entire lens system in the telephoto end state.

6. The zoom lens according to claim 1, wherein a conditional expression (5)

$$0.8 < Dt/Z2 < 1.2 \tag{5}$$

is satisfied where Dt is the distance from said aperture stop to that lens face of said fourth lens group which is positioned nearest to the image side along the optical axis in the telephoto end state, and Z2 is the amount of movement of said second lens group when the lens position state varies from the wide angle end state to the telephoto end state.

7. An image pickup apparatus, comprising:
a zoom lens; and
an image pickup element for converting an optical image formed by said zoom lens into an electric signal;
said zoom lens including four lens groups including a first lens group having a positive refracting power, a second lens group having a negative refracting power, a third lens group having a positive refracting power and a fourth lens group having a positive refracting power, said first, second, third and fourth lens groups being disposed in order from an object side, said second lens group moving, when a lens position state varies from a wide angle end state to a telephoto end state, to an image side while said fourth lens group moves so as to compensate for a variation of an image plane position caused by the movement of said second lens group whereas said first and third lens groups are fixed in the direction of an optical axis, and an aperture stop disposed on the object side of said third lens group, said third lens group including a negative sub group having a negative refracting power and a positive sub group having a positive refracting power and disposed on the image side of said negative sub group with an air distance left therebetween, said positive sub group being shiftable in a direction substantially perpendicular to the optical axis to shift an image in a direction substantially perpendicular to the optical axis, a conditional expression (1)

$$1.4 < |f3n|/f3 < 3 \tag{1}$$

being satisfied where f3$n$ is the focal distance of said negative sub group disposed in said third lens group and f3 is the focal distance of said third lens group.

8. The image pickup apparatus according to claim 7, further comprising:
a hand shake detection section for detecting a shake of said image pickup element;
a hand shake control section for calculating a blur correction angle for correcting an image blur by the shake of said image pickup element detected by said hand shake detection section and signaling a driving signal for positioning said positive sub group of said third lens group at a position based on the blur correction angle; and
a hand shake driving section for receiving the driving signal signaled from said hand shake control section and shifting said positive sub group in a direction perpendicular to the optical axis based on the received driving signal.

* * * * *

UNITED STATES PATENT AND TRADEMARK OFFICE
CERTIFICATE OF CORRECTION

PATENT NO.        : 7,245,442 B2
APPLICATION NO.   : 11/455147
DATED             : July 17, 2007
INVENTOR(S)       : Motoyuki Ohtake It is certified that error appears in the above-identified patent and that said Letters Patent is hereby corrected as shown below:

Front Page:
Item (54) should read -- ZOOM LENS AND IMAGE PICKUP APPARATUS --.

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,245,442 B2
APPLICATION NO. : 11/455147
DATED : July 17, 2007
INVENTOR(S) : Motoyuki Ohtake It is certified that error appears in the above-identified patent and that said Letters Patent is hereby corrected as shown below:

Front Page:
Item (54) and Column 1, line 1, should read -- ZOOM LENS AND IMAGE PICKUP APPARATUS --.

This certificate supersedes the Certificate of Correction issued September 2, 2008.

Signed and Sealed this

Thirtieth Day of September, 2008

JON W. DUDAS
*Director of the United States Patent and Trademark Office*